(12) United States Patent
Hoshi et al.

(10) Patent No.: US 7,654,133 B2
(45) Date of Patent: Feb. 2, 2010

(54) MALFUNCTION DIAGNOSTIC APPARATUS AND MALFUNCTION DIAGNOSTIC METHOD FOR COMBUSTION IMPROVEMENT DEVICE

(75) Inventors: Koichi Hoshi, Susono (JP); Shogo Suda, Susono (JP); Makoto Tomimatsu, Susono (JP); Nobuhiko Koga, Susono (JP); Yuuichi Kato, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 78 days.

(21) Appl. No.: 11/854,909

(22) Filed: Sep. 13, 2007

(65) Prior Publication Data
US 2008/0060427 A1 Mar. 13, 2008

(30) Foreign Application Priority Data
Sep. 13, 2006 (JP) .............................. 2006-247423

(51) Int. Cl.
G01M 15/05 (2006.01)
(52) U.S. Cl. ................................................. 73/114.32
(58) Field of Classification Search ................ 73/14.02, 73/14.08, 14.24, 14.25, 14.26, 14.31, 14.32; 123/295, 306
See application file for complete search history.

(56) References Cited

U.S. PATENT DOCUMENTS

| | | | | |
|---|---|---|---|---|
| 5,186,136 A * | 2/1993 | Kadomukai et al. | ...... | 123/192.1 |
| 5,231,964 A * | 8/1993 | Harada | ........................ | 123/306 |
| 5,263,364 A * | 11/1993 | Nakayama et al. | ....... | 73/114.04 |
| 5,263,453 A * | 11/1993 | Wakahara et al. | ........... | 123/436 |
| 5,307,671 A * | 5/1994 | Akase | ..................... | 73/114.04 |
| 5,485,374 A * | 1/1996 | Takaku et al. | ................. | 701/29 |
| 5,487,008 A * | 1/1996 | Ribbens et al. | ............. | 701/102 |
| 5,506,778 A * | 4/1996 | Matsumoto et al. | ......... | 701/111 |
| 5,808,186 A * | 9/1998 | Matsumoto et al. | ...... | 73/114.03 |
| 6,019,082 A * | 2/2000 | Mashiki et al. | ............. | 123/308 |
| 6,155,105 A * | 12/2000 | Klenk et al. | ............. | 73/114.03 |
| 6,430,495 B2 * | 8/2002 | Takaku et al. | ................ | 701/114 |
| 6,725,709 B2 * | 4/2004 | Takaku et al. | ............. | 73/114.03 |
| 6,993,427 B2 | 1/2006 | Ueda | | |
| 2004/0044461 A1 * | 3/2004 | Ueda | .......................... | 701/111 |
| 2005/0071073 A1 * | 3/2005 | Ueda et al. | .................. | 701/101 |

FOREIGN PATENT DOCUMENTS

| | | |
|---|---|---|
| JP | 5-187240 | 7/1993 |
| JP | 7-83101 | 3/1995 |
| JP | 8-200140 | 8/1996 |

(Continued)

*Primary Examiner*—Lisa M Caputo
*Assistant Examiner*—Freddie Kirkland, III
(74) *Attorney, Agent, or Firm*—Oblon, Spivak, McClelland, Maier & Neustadt, L.L.P.

(57) ABSTRACT

A malfunction diagnostic apparatus for a combustion improvement device that is disposed in an intake passage connected to each of combustion chambers in an internal combustion engine to improve a combustion state, includes a detector that detects an average crank angular acceleration or a correlated value correlated with the average crank angular acceleration in each of cylinders in the internal combustion engine; an operating state detector that detects a current operating state of the combustion improvement device; and a malfunction determination device that determines whether a malfunction occurs in the combustion improvement device for each of the cylinders, based on the average crank angular acceleration or the correlated value and the current operating state of the combustion improvement device.

19 Claims, 25 Drawing Sheets

FOREIGN PATENT DOCUMENTS

| | | |
|---|---|---|
| JP | 9-209810 | 8/1997 |
| JP | 10-121991 | 5/1998 |
| JP | 2000-54906 | 2/2000 |
| JP | 2002-227695 | 8/2002 |
| JP | 2005-61371 | 3/2005 |

* cited by examiner

MALFUNCTION DIAGNOSTIC APPARATUS AND MALFUNCTION DIAGNOSTIC METHOD FOR COMBUSTION IMPROVEMENT DEVICE

INCORPORATION BY REFERENCE

The disclosure of Japanese Patent Application No. 2006-247423 filed on Sep. 13, 2006 including the specification, drawings and abstract is incorporated herein by reference in its entirety.

BACKGROUND OF THE INVENTION

1. Field of the Invention

The invention relates to a malfunction diagnostic apparatus and a malfunction diagnostic method for a combustion improvement device. More specifically, the invention relates to a malfunction diagnostic apparatus and a malfunction diagnostic method for a combustion improvement device, which determine whether a malfunction occurs in a combustion improvement device for each of cylinders, with low cost, and with high determination performance.

2. Description of the Related Art

Conventionally, an internal combustion engine in which a combustion improvement device is provided is available. The combustion improvement device, disposed in an intake passage connected to a combustion chamber, improves a combustion state. As an example of the combustion improvement device, an airflow control valve is generally available. The airflow control valve generates a tumble flow and a swirl flow. When a malfunction occurs in the combustion improvement device, combustion is not performed in an intended manner. Accordingly, the combustion state is deteriorated, and as a result, the combustion state varies among cylinders, or emissions are increased. Thus, it is important to determine whether a malfunction occurs in the combustion improvement device with high determination performance, to change a control to another control for dealing with a malfunction, or quickly repair a malfunction when a malfunction occurs.

With regard to determination as to whether a malfunction occurs in the combustion improvement device, for example, Japanese Patent Application Publication No. 10-121991 (JP-A-10-121991) describes a technology in which it is determined whether a malfunction occurs in an intake control valve using an air-fuel ratio. Japanese Patent Application Publication No. 07-83101 (JP-A-07-83101) describes a technology in which it is determined whether a malfunction occurs in an SVC (Swirl Control Valve) by comparing a normal combustion period with an actual combustion period using a combustion pressure sensor. Japanese Patent Application Publication No. 09-209810 (JP-A-09-209810) describes a technology in which it is determined whether a malfunction occurs in a TCV (Tumble Control Valve) based on the difference in the pressure upstream of the TCV between when the TCV is open and when the TCV is closed, using a pressure sensor. Each of the intake control valve, the SCV, and the TCV is equivalent to the combustion improvement device. With regard to determination on the combustion state, for example, Japanese Patent Application Publication No. 2004-92603 (JP-A-2004-92603) describes a technology in which the combustion state in each cylinder is estimated using a crank angular acceleration. Japanese Patent Application Publication No. 2005-61371 (JP-A-2005-61371) describes a technology in which a cylinder, in which the combustion state is deteriorated, is determined using a crank angular acceleration, and the combustion state is recovered by correcting an ignition timing and the like.

For example, in the technology using the air-fuel ratio described in the publication No. 10-121991, it is not possible to determine the cylinder corresponding to the combustion improvement device in which a malfunction occurs. In this case, when it is determined that a malfunction occurs, it is not possible to restrict the operating condition in each cylinder. Therefore, for example, when a control is changed to another control for dealing with the malfunction, the operation in the normal cylinders may be spoiled. Examples of the malfunction conditions of the combustion improvement devices are as follows. All the airflow control valves may be kept in the open position or closed position, and therefore all the airflow control valves may malfunction. At least one airflow control valve may be deformed or broken, or may fall, and therefore, the combustion state may be deteriorated in the cylinder corresponding to the at least one airflow control valve. Also, the combustion state may be deteriorated in a specific cylinder due to the torsion of a valve shaft that axially supports the airflow control valves. The airflow control valve may be deformed or broken, or fall, when the airflow control valve is made of resin, and a back fire occurs.

In the technologies described in the publication No. 07-83101 and the publication No. 09-209810, it is possible to determine whether a malfunction occurs in the combustion improvement device for each cylinder. However, in the technologies described in the publication No. 07-83101 and the publication No. 09-209810, a cylinder pressure sensor or an intake passage pressure sensor needs to be newly provided to determine whether a malfunction occurs, in the case where such a sensor is not provided. Therefore, the cost of the entire configuration may be increased. Also, in the technologies, the determination performance is not taken into account. Therefore, when a relatively minor malfunction occurs, for example, a malfunction occurs due to the deformation of the airflow control valve, it may not be possible to determine that the minor malfunction occurs. In the technologies described in the publication No. 2004-92603 and the publication No. 2005-61371, it is not possible to determine whether the combustion state is deteriorated due to the malfunction of the combustion improvement device, or due to inhalation of air into an intake system, or due to the malfunction of a fuel injection system. Therefore, in the technologies described in the publication No. 2004-92603 and the publication No. 2005-61371, a control may not be switched to an appropriate control for dealing with a malfunction, according to the cause of the malfunction, or it may take much time to determine the cause of the malfunction to repair the malfunction, and thus, the malfunction may not be quickly repaired.

SUMMARY OF THE INVENTION

The invention provides a malfunction diagnostic apparatus and a malfunction diagnostic method for a combustion improvement device, which determine whether a malfunction occurs in a combustion improvement device for each of cylinders, with low cost and with high determination performance.

A first aspect of the invention relates to a malfunction diagnostic apparatus for a combustion improvement device. The malfunction diagnostic apparatus includes a combustion improvement device disposed in an intake passage connected to each of combustion chambers in an internal combustion engine to improve a combustion state; a detector that detects an average crank angular acceleration or a correlated value correlated with the average crank angular acceleration in each of cylinders in the internal combustion engine; an operating state detector that detects a current operating state of the combustion improvement device; and a malfunction determination device that determines whether a malfunction occurs in the combustion improvement device for each of the cylinders, based on the average crank angular acceleration or the correlated value and the current operating state of the combustion improvement device.

The average crank angular acceleration is the average value of plural crank angular accelerations in each cylinder, which are calculated in plural combustion cycles. For example, the crank angular accelerations may be calculated in each cylinder in an interval from a TDC (Top Dead Center) to a BDC (Bottom Dead Center) during an expansion stroke in the internal combustion engine. The average crank angular acceleration and the crank angular accelerations are calculated in each cylinder based on signals output from a crank angular sensor that is generally disposed in the internal combustion engine. Further, the average crank angular acceleration thus calculated tends to be a negative value when the combustion state is deteriorated. In the first aspect of the invention, this characteristic is taken into account. According to the first aspect of the invention, it is possible to determine whether the combustion state is deteriorated. The combustion state may be deteriorated, not only due to the malfunction of the airflow control valve, but also due to the inhalation of air into an intake system, or the malfunction of a fuel injection system. Accordingly, in the first aspect of the invention, it is determined whether the combustion state is deteriorated due to the malfunction of the combustion improvement device, further based on the operating state of the combustion improvement device. Thus, according to the first aspect of the invention, it is possible to determine whether a malfunction occurs in the combustion improvement device for each cylinder.

According to a second aspect of the invention, if the average crank angular acceleration is a negative value in at least one of the cylinders when at least one of the combustion improvement devices for the at least one of the cylinders is operated, and if the average crank angular acceleration is a positive value in the at least one of the cylinders when the at least one of the combustion improvement devices for the at least one of the cylinders is not operated, the malfunction determination device may determine that a malfunction occurs in the at least one of the combustion improvement devices for the at least one of the cylinders in which the average crank angular acceleration is the negative value when the at least one of the combustion improvement devices for the at least one of the cylinders is operated. More specifically, for example, based on the operating state of the combustion improvement device as in the second aspect of the invention, it is possible to determine whether the combustion state is deteriorated due to the malfunction of the combustion improvement device. If the combustion state is deteriorated when the combustion improvement device is operated, the cause of the deterioration of the combustion state is not limited to the malfunction of the combustion improvement device, and may be the inhalation of air into the intake system, the malfunction of the fuel injection system, or the like, as described above. However, if the combustion state is not deteriorated when the combustion improvement device is not operated, it is possible to determine that the cause of the deterioration of the combustion state is the malfunction of the combustion improvement device. Thus, according to the second aspect of the invention, it is possible to determine whether the combustion state is deteriorated due to the malfunction of the combustion improvement device.

According to a third aspect of the invention, the malfunction determination device may determine whether a malfunction occurs in the combustion improvement device for each of the cylinders, based on the length of the trajectory showing variation in the crank angular acceleration in a predetermined time after the internal combustion engine starts, instead of the average crank angular acceleration of the first aspect. In the predetermined time after the internal combustion engine starts, the temperature of an air-fuel ratio sensor does not reach a temperature at which the air-fuel ratio sensor is activated, and therefore, a feedback control on the air-fuel ratio is not executed. In this case, particularly in the cylinder in which the combustion state is deteriorated, the combustion state greatly varies, and therefore, the crank angular acceleration greatly varies. As a result, the trajectory length is definitely long in the cylinder in which the combustion state is deteriorated. In the third aspect of the invention, this characteristic is taken into account. According to the third aspect of the invention, it is possible to determine whether a malfunction occurs in the combustion improvement device for each cylinder with high determination performance. More specifically, for example, when the length of the trajectory is longer than a predetermined value in at least one cylinder, the malfunction determination device determines that a malfunction occurs in at least one combustion improvement device for the at least one cylinder in which the length of the trajectory is longer than the predetermined value.

According to a fourth aspect of the invention, the detector of the malfunction diagnostic apparatus may further include an opening cross-sectional area estimator that estimates, as the correlated value, an opening cross-sectional area of the intake passage when the combustion improvement device is operated, based on the average crank angular acceleration. The malfunction determination device may determine whether a malfunction occurs in the combustion improvement device for each of the cylinders, based on the opening cross-sectional area estimated by the opening cross-sectional area estimator. For example, a malfunction due to the deformation of the airflow control valve is a relatively minor malfunction. Therefore, high determination performance is required to determine whether such a minor malfunction occurs. However, the average crank angular acceleration is likely to vary among systems with the same configuration due to manufacturing tolerance, or the like. Therefore, if it is determined whether a malfunction occurs in the combustion improvement device for each cylinder by comparing the average crank angular acceleration in each cylinder with a determination reference value when the combustion improvement devices are in a certain state (for example, when the airflow control valves are controlled to be in the fully-closed position), it may be erroneously determined that no malfunction occurs in the combustion improvement device in which a malfunction actually occurs due to, for example, the deformation of the airflow control valve.

In contrast, the combustion state is generally correlated with the opening cross-sectional area of the intake passage in terms of the level of mixing of air and fuel. Therefore, when the correlation between the average crank angular acceleration, which also indicates the combustion state, and the opening cross-sectional area of the intake passage is determined in each internal combustion engine system, the opening cross-sectional area of the intake passage is estimated based on the average crank angular acceleration. Also, because the opening cross-sectional area of the intake passage is estimated based on the average crank angular acceleration, instead of setting a different determination reference value for the average crank angular acceleration in each system, the estimated opening cross-sectional area of the intake passage is effectively used in the other control. In the aspect in which the characteristic is taken into account, by determining in advance the correlation between the opening cross-sectional area of the intake passage and the average crank angular acceleration in each system, it is possible to determine whether a minor malfunction occurs due to, for example, the deformation of the airflow control valve, using a common determination reference value, with high determination performance. More specifically, for example, when the opening cross-sectional area of the intake passage for at least one cylinder is larger than a predetermined value, the malfunction determination device determines that a malfunction occurs in at least one combustion improvement device for the at least one cylinder.

According to a fifth aspect of the invention, the detector of the malfunction diagnostic apparatus may further include an ignition retard amount calculator that calculates, as the correlated value, an ignition retard amount corresponding to the substantially same average crank angular acceleration in each of the cylinders. The malfunction determination device may determine whether a malfunction occurs in the combustion improvement device for each of the cylinders, based on the ignition retard amount in each of the cylinders, which is calculated by the ignition retard amount calculator. When the ignition timing is retarded, the combustion state is likely to be unstable. When the ignition timings in the cylinders are retarded, and the same combustion state is achieved in the cylinders, the ignition retard amount in a normal cylinder is larger than the ignition retard amount in a malfunctioning cylinder, because the combustion state in the normal cylinder is more stable than the combustion state in the malfunctioning cylinder. In other words, because the combustion state is deteriorated in the malfunctioning cylinder, the ignition timing in the malfunctioning cylinder can be retarded by only a small ignition retard amount. In the fifth aspect of the invention, this characteristic is taken into account. According to the fifth aspect of the invention, it is possible to determine whether a malfunction occurs in the combustion improvement device for each cylinder. More specifically, for example, when the ignition retard amount is smaller than a predetermined value in at least one cylinder the malfunction determination device determines that a malfunction occurs in at least one combustion improvement device for the at least one cylinder.

According to the aspects of the invention, it is possible to provide the malfunction diagnostic apparatus and the malfunction diagnostic method for the combustion improvement device, which determine whether a malfunction occurs in the combustion improvement device for each cylinder with low cost, and with high determination performance.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

Hereinafter, embodiments of the invention will be described in detail with reference to the accompanying drawings.

Figure 1:
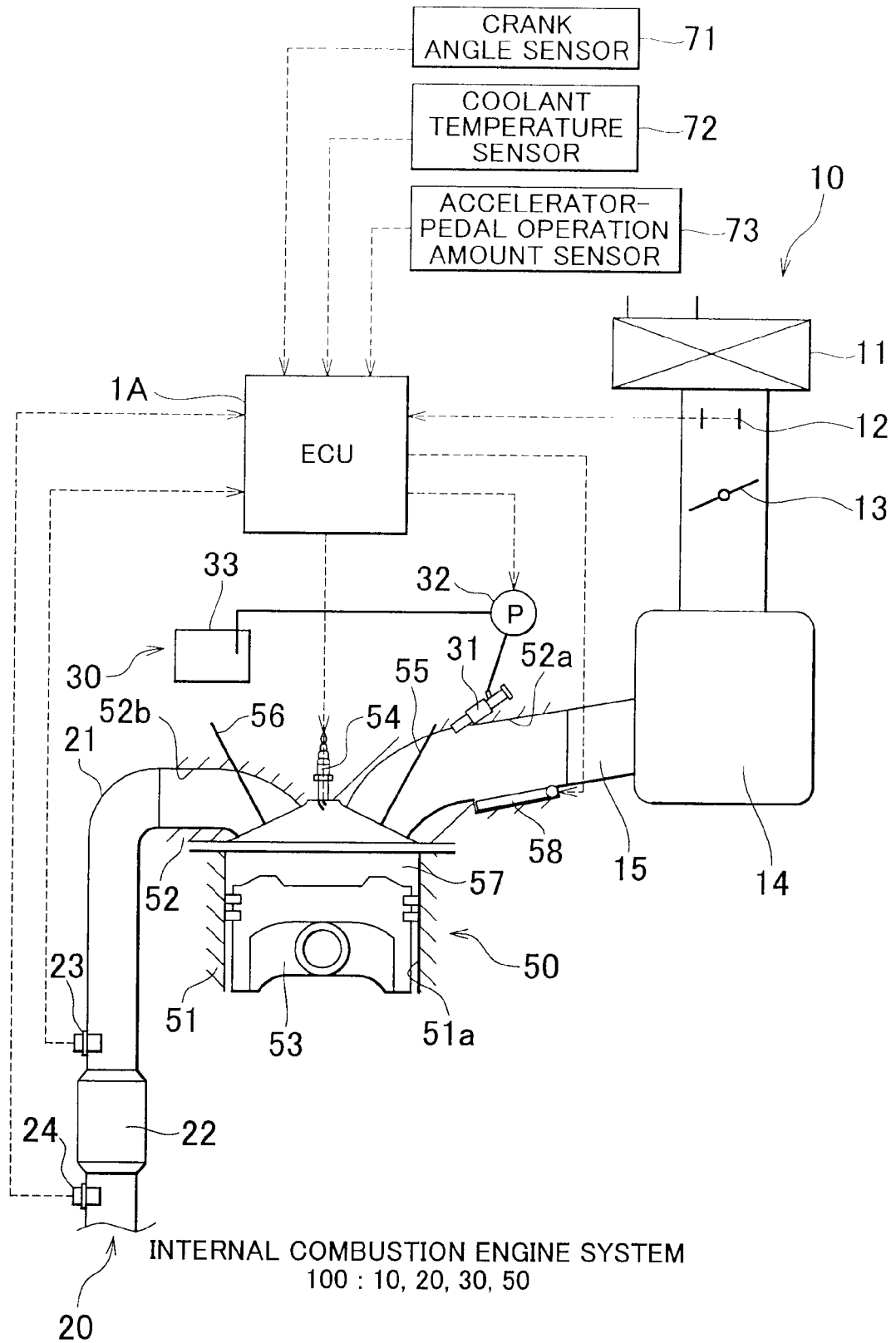
FIG. 1 is a schematic diagram showing an ECU 1A, and an internal combustion engine system.

FIG. 1 is a schematic diagram showing a malfunction diagnostic apparatus for combustion improvement device according to an embodiment of the invention, and an internal combustion engine system 100. The malfunction diagnostic apparatus according to the embodiment is implemented by an ECU (Electronic Control Unit) 1A. The internal combustion engine system 100 includes an intake system 10, an exhaust system 20, a fuel injection system 30, and an internal combustion engine 50. Air is introduced into the internal combustion engine 50 through the intake air system 10. The intake air system 10 includes an air cleaner 11 that filters intake air, an airflow meter 12 that measures the amount of air, a throttle valve 13 that adjusts the flow amount of intake air, a surge tank 14 that temporarily stores the intake air, an intake manifold 15 that distributes the intake air to cylinders of the internal combustion engine 50, and an intake pipe that is appropriately disposed to connect these components.

The exhaust system 20 includes an exhaust manifold 21, a three-way catalyst 22, a silencer (not shown), and an exhaust pipe that is appropriately disposed to connect these components. The flows of exhaust gas discharged from the cylinders join together in the exhaust manifold 21. In the exhaust manifold 21, branched exhaust passages for the cylinders are connected to one exhaust passage on a downstream side. The three-way catalyst 22 purifies the exhaust gas by oxidizing hydrocarbon HC and carbon monoxide CO, and reducing nitrogen oxide NOx. In the exhaust system 20, an air-fuel ratio sensor 23 and an oxygen sensor 24 are provided as air-fuel ratio sensors. More specifically, the air-fuel ratio sensor 23 is disposed upstream of the three-way catalyst 22, and the oxygen sensor 24 is disposed downstream of the three-way catalyst 22. The air-fuel ratio sensor 22 linearly detects the air-fuel ratio based on the concentration of oxygen in the exhaust gas. The oxygen sensor 24 detects whether the air-fuel ratio is richer or leaner than a stoichiometric air-fuel ratio, based on the concentration of oxygen in the exhaust gas.

The fuel injection system 30 supplies and injects fuel. The fuel injection system 30 includes a fuel injection valve 31, a fuel injection pump 32, and a fuel tank 33. The fuel injection valve 31 injects the fuel. More specifically, the ECU 1A controls the fuel injection valve 31 is open to inject the fuel at an appropriate injection timing. The ECU 1A controls a valve opening period to adjust a fuel injection amount. The fuel injection pump 32 pressurizes the fuel to generate an injection pressure. The ECU 1A adjusts the injection pressure.

The internal combustion engine 50 includes a cylinder block 51, a cylinder head 52, pistons 53, ignition plugs 54, intake valves 55, and exhaust valves 56. The internal combustion engine 50 in the embodiment is an inline four-cylinder gasoline engine. The internal combustion engine 50 in the embodiment is not limited to a specific internal combustion engine. Any internal combustion engine may be employed, as long as the invention is implemented using the internal combustion engine. For example, a diesel engine may be employed. Also, the internal combustion engine 50 may have any other appropriate cylinder arrangement, and any other appropriate number of cylinders. In the case of the diesel engine, the ignition plug 54 is not necessary. In FIG. 1, in the internal combustion engine 50, the main portion of a cylinder 51a, which is one of the cylinders, is shown. Each of the other cylinders has the same configuration. In the cylinder block 51, the cylinder 51a having a substantially cylindrical shape is formed. The piston 53 is housed in the cylinder 51a. The cylinder head 52 is fixed to the upper surface of the cylinder block 51. A combustion chamber 57 is formed as a space surrounded by the cylinder block 51, the cylinder head 52, and the piston 53.

In the cylinder head 52, an intake port 52a, an exhaust port 52b, the intake valve 55, and the exhaust valve 56 are provided. Intake air is introduced into the combustion chamber 57 through the intake port 52a. The exhaust gas generated by combustion is discharged through the exhaust port 52b. The intake valve 55 and the exhaust valve 56 open and close the intake port 52a and the exhaust port 52b, respectively. The internal combustion engine 50 may have an intake/exhaust valve structure in which an appropriate number of intake valves 55 and an appropriate number of exhaust valves 56 are provided for each cylinder. The ignition plug 54 is disposed in the cylinder head 52 such that an electrode protrudes into the upper area of the combustion chamber 57 at a substantially center position. The fuel injection valve 31 is disposed in the cylinder head 52 to inject the fuel into the intake port 52a to perform so-called port injection. The fuel injection valve 31 may be disposed to directly inject the fuel into the cylinder.

Figure 2:
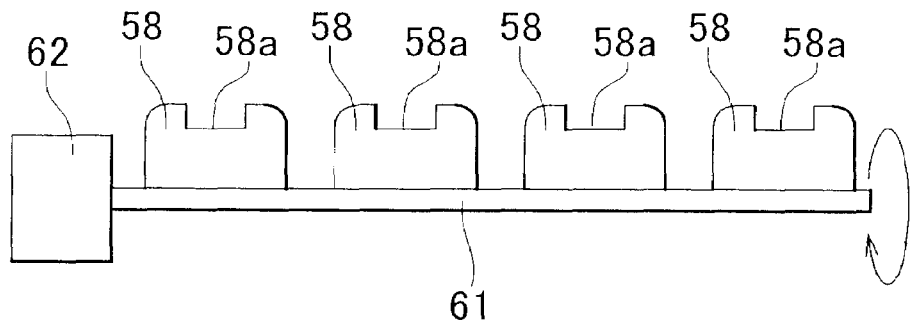
FIG. 2 is a diagram showing an assembly of the airflow control valves, a valve shaft, and an actuator.

An airflow control valve 58, which generates a tumble flow in the combustion chamber 57, is disposed in the intake port 52a. The airflow control valve 58 generates the tumble flow in the combustion chamber 57, by biasing the flow of intake air in the intake port 52a, under the control of the ECU 1A. FIG. 2 shows the assembly of the airflow control valves 58, a valve shaft 61, and an actuator 62. The airflow control valves 58 are fixed to the one valve shaft 61 such that the airflow control valves 58 are arranged in a line. The actuator 62 is connected to one end of the valve shaft 61. A notch portion 58a having a predetermined opening area is formed in the leading end of each airflow control valve 58. The notch portions 58a increase the flow speed of intake air, particularly when the airflow control valves 58 are in a fully-closed position. The airflow control valves 58 may be provided in the intake passages formed by the intake manifold 15. The airflow control valve 58 is not limited to an airflow control valve that generates the tumble flow. An airflow control valve that generates a reverse tumble flow, a swirl flow, or an oblique tumble flow formed by combining the tumble flow and the swirl flow, as long as the airflow control valve generates a strong swirling airflow in the combustion chamber 57 to promote the level of mixing of air and fuel when the airflow control valve 58 is in a predetermined valve-opening position. In the embodiment, the combustion improvement device is implemented by the airflow control valve 58. In addition, in the internal combustion engine 50, sensors such as a crank angle sensor 71 and a coolant temperature sensor 72 are disposed. The crank angle sensor 71 generates an output pulse that is proportional to an engine speed Ne. The coolant temperature sensor 72 detects the temperature of coolant for the internal combustion engine 50.

The ECU 1A includes a CPU (Center Processing Unit), ROM (Read Only Memory), RAM (Random Access Memory), and an input/output circuit. The ECU 1A mainly controls the internal combustion engine 50. In the embodiment, the ECU 1A controls, for example, the fuel injection valves 31, the fuel injection pump 32, the ignition plugs 54 (more specifically, igniters (not shown), and the airflow control valves 58 (more specifically, the actuator 62). The ECU 1A is connected to, for example, the fuel injection valves 31 and the other devices to be controlled, via a drive circuit (not shown). The ECU 1A is connected to the sensors such as the airflow meter 12, the crank angle sensor 71, the coolant temperature sensor 72, and an accelerator-pedal operation amount sensor 73 that detects the depressed amount (accelerator pedal operation amount) of an accelerator pedal (not shown).

The ROM stores programs in which processes executed by the CPU are described. In the embodiment, the ROM stores, for example, a program for controlling the internal combustion engine 50, a fuel injection valve control program for controlling the fuel injection valves 31, an air-fuel ratio feedback control program for executing a feedback control on the air fuel ratio using the air-fuel ratio sensor 23 and the oxygen sensor 24, a crank angular acceleration calculation program for calculating a crank angular acceleration in each cylinder, based on the signal output from the crank angle sensor 71, an average crank angular acceleration calculation program for calculating an average value of plural crank angular accelerations in each cylinder, which are calculated in plural combustion cycles (hereinafter, the average value will be simply referred to as "average crank angular acceleration"), and malfunction determination program for determining whether a malfunction occurs in the airflow control valve 58 for each cylinder, based on the average crank angular acceleration in each cylinder, and the operating state of the airflow control valve 58 for each cylinder. These programs may be configured as a part of the program for controlling the internal combustion engine 50.

More specifically, the malfunction determination program is made such that if the average crank angular acceleration is a negative value in at least one cylinder when the airflow control valves 58 are operated (that is, when the airflow control valves 58 are controlled to be in the fully-closed position in the embodiment), it is temporarily determined that a malfunction occurs in at least one airflow control valve 58 for the at least one cylinder in which the average crank angular acceleration is a negative value. Further, if the average crank angular acceleration is not a negative value in the at least one cylinder for the at least one airflow control valve 58 in which it is temporarily determined that a malfunction occurs, when the at least one airflow control valve 58 is not operated (that is, when the at least one airflow control valve 58 is controlled to be in the fully-open position), it is determined that a malfunction actually occurs in the at least one airflow control valve 58. In the embodiment, the detectors (detection means), the determination devices (determination means), the controllers (control means), and the like are implemented by the CPU, ROM, and RAM (hereinafter, simply referred to as "CPU and the like"), and the program for controlling the internal combustion engine 50. Particularly, the crank angular acceleration detector is implemented by the CPU and the like, and the crank angular acceleration calculation program. The average crank angular acceleration detector is implemented by the CPU and the like, and the average crank angular acceleration calculation program. The malfunction determination device is implemented by the CPU and the like, and the malfunction determination program.

Figure 3:
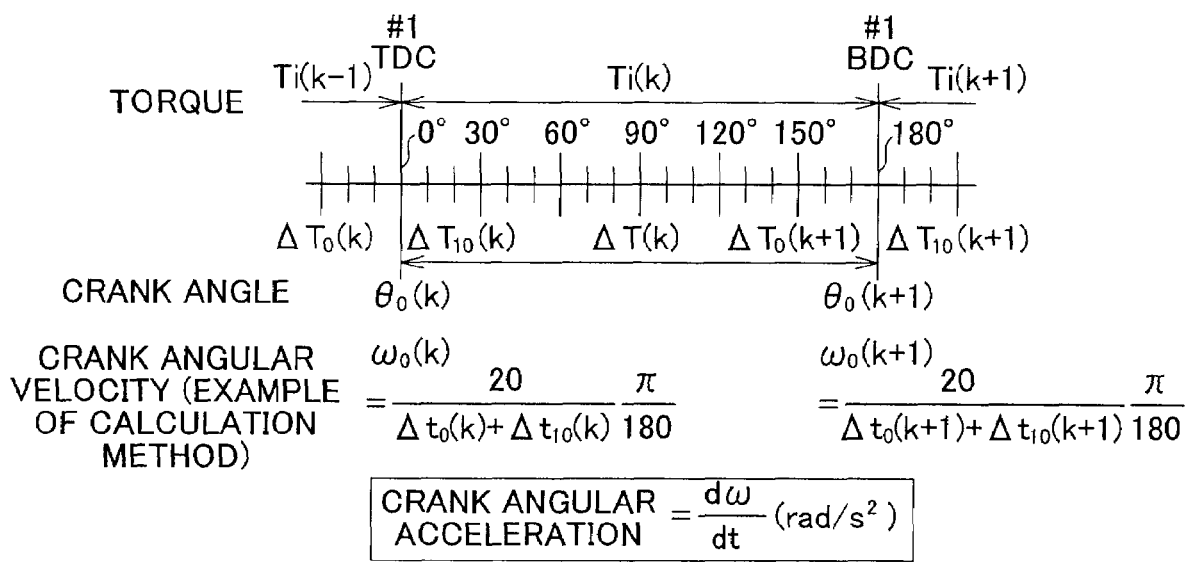
FIG. 3 is a schematic diagram showing an example of a method of calculating a crank angular acceleration.

FIG. 3 is a schematic diagram showing an example of a method of calculating the crank angular acceleration. In the embodiment, to calculate the crank angular acceleration, the signal output from the crank angle sensor 71 is detected at intervals of crank angle 10 degrees. Also, in the embodiment, angular velocities $\omega_0$ (k), and $\omega_0$ (k+1) are determined at two crank angle positions at TDC (Top Dead Center) and BDC (Bottom Dead Center), respectively. At the same time, a period $\Delta t$ (k), during which the crankshaft rotates from the TDC to the BDC, is determined. When the angular velocity $\omega_0$ (k) is determined, for example, as shown in FIG. 3, a period $\Delta t_0$ (k), during which the crank angle changes by 10 degrees to reach the TDC, and a period $\Delta t_{10}$ (k), during which the crank angle changes from the TDC by 10 degrees, are determined. Because the crank angle changes by 20 degrees during a period $\Delta t_0$ (k)+$\Delta t_{10}$ (k), the angular velocity $\omega_0$ (k) [rad/s] is calculated according to the equation, $\omega_0$ (k)=(20/($\Delta t_0$ (k)+$\Delta t_{10}$ (k))×($\pi$/180). Similarly, when the angular velocity $\omega_0$ (k+1) is calculated, a period $\Delta t_0$ (k+1), during which the crank angle changes by 10 degrees to reach the BDC, and a period $\Delta t_{10}$ (k+1), during which the crank angle changes from the BDC by 10 degrees, are determined. The angular velocity $\omega 0$ (k+1) [rad/s] is calculated according to the equation, $\omega_0$ (k+1)=(20/($\Delta t_0$ (k+1)+$\Delta t_{10}$ (k+1))×($\pi$/180). Further, the crank angular acceleration in the interval from the TDC to the BDC is calculated using the angular velocities $\omega_0$ (k), and $\omega_0$ (k+1), according to the equation, ($\omega_0$ (k+1)−$\omega_0$ (k))/$\Delta t(k)$.

The average value of inertia torque is substantially zero in the interval from the TDC to the BDC. Therefore, by determining the crank angular acceleration in the interval, it is possible to eliminate the influence of reciprocating inertia mass. Thus, the crank angular acceleration due to only the combustion state is calculated. As a result, it is possible to estimate the combustion state based on the crank angular acceleration. The internal combustion engine 50 includes the four cylinders #1 to #4. An expansion stroke is performed in the cylinder #1, in the cylinder #3, in the cylinder #4, and in the cylinder #2 in the stated order, at intervals of crank angle 180 degrees. Accordingly, for example, when the expansion stroke is performed in the cylinder #1, a compression stroke is performed in the cylinder #3, an intake stroke is performed in the cylinder #4, and an exhaust stroke is performed in the cylinder #2. Torque in each of the compression stroke, the intake stroke, and the exhaust stroke is by far smaller than torque due to the pressure of gas generated in the cylinder in the expansion stroke. Therefore, the crank angular acceleration in the cylinder #1 calculated in the expansion stroke is regarded as reflecting the pressure of the gas generated in the cylinder due to combustion in the cylinder #1. Accordingly, by calculating the crank angular acceleration in each cylinder in the expansion stroke, it is possible to calculate the crank angular acceleration in each cylinder, based on which the combustion state is estimated. In the embodiment, the crank angular acceleration calculation program is made so that the crank angular acceleration is calculated in the above-described manner.

Figure 4:
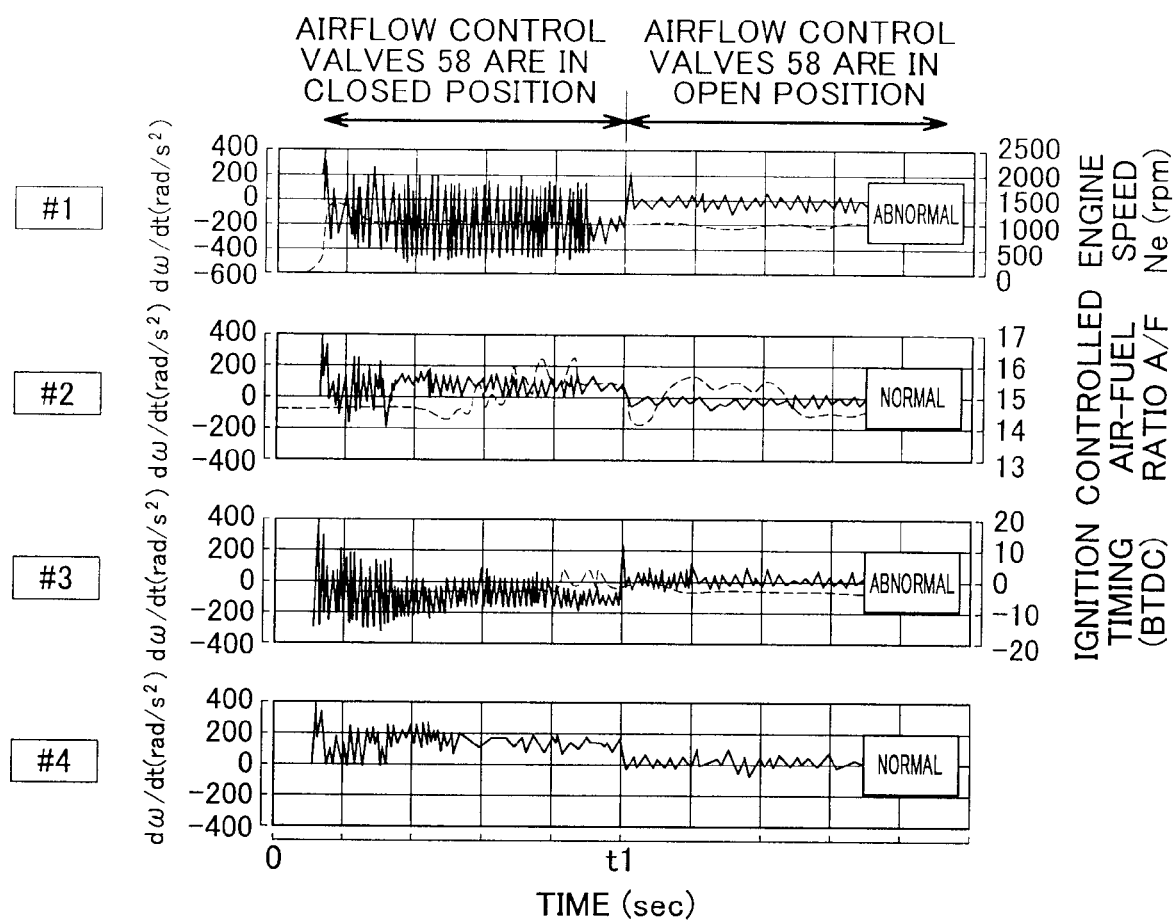
FIG. 4 is a diagram showing how the crank angular acceleration in each cylinder changes with time when the operating state of the airflow control valves changes.

FIG. 4 is a diagram showing how the crank angular acceleration in each cylinder changes with time, when the operating state of the airflow control valves 58 changes. In this case, the airflow control valve 58 for each of the cylinders #1 and #3 is removed from the intake port 52a to simulate a situation where a malfunction occurs in the airflow control valve 58. In this situation, the airflow control valves 58 for the cylinders #1 to #4 are controlled to be in the fully-closed position up to time point t1, and then, the airflow control valves 58 are controlled to be in the fully-open position. When the airflow control valves 58 are controlled to be in the fully-closed position, the distribution of the crank angular acceleration is biased toward a deceleration-side, i.e., the crank angular acceleration tends to be a negative value in each of the cylinders #1 and #3. In contrast, the distribution of the crank angular acceleration is biased toward an acceleration-side, i.e., the crank angular acceleration tends to be a positive value in each of the cylinders #2 and #4. This is because the engine speed Ne is reduced due to the deterioration of the combustion state in each of the cylinders #1 and #3. In contrast, when the airflow control valves 58 are controlled to be in the fully-open position, the distribution of the crank angular acceleration is biased toward zero, in each of all the cylinders. This is because when the airflow control valves 58 are in the fully-open position, the airflow control valves 58 do not contribute to improvement of the combustion. Therefore, even when a malfunction occurs in at least one airflow control valve 58 due to, for example, deformation, breakage, or falling of the at least one airflow control valve 58, the combustion state, i.e., the crank angular acceleration is not adversely affected.

Figure 5A:
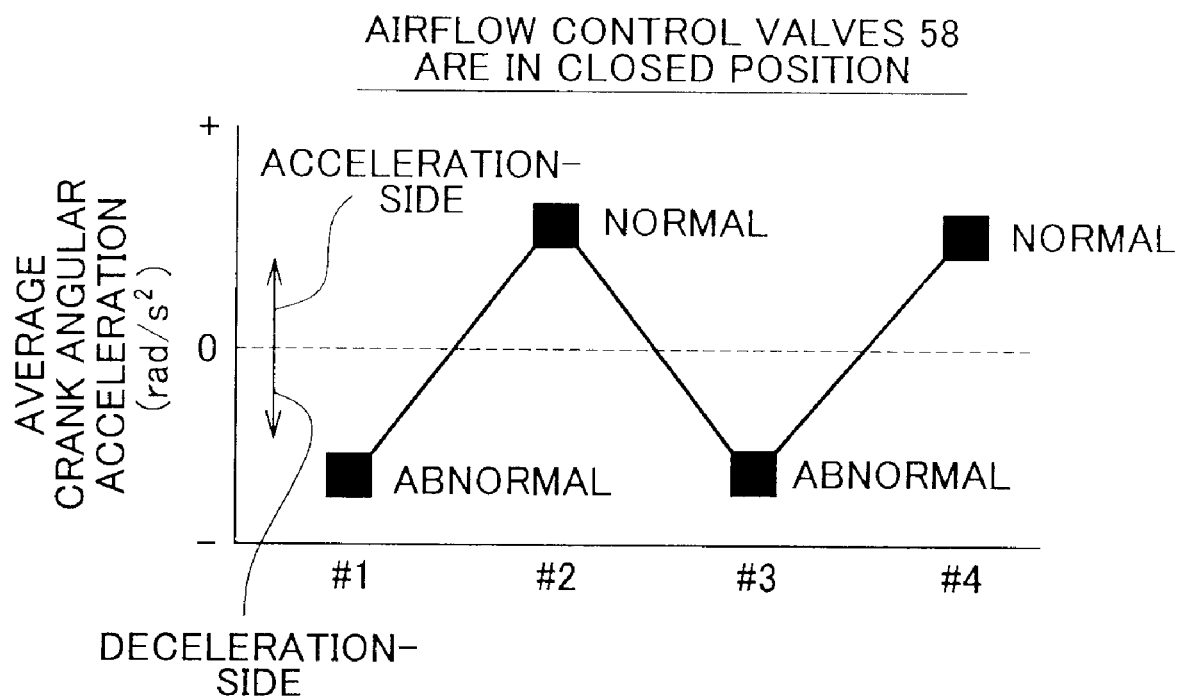
FIGS. 5A and 5B are schematic diagrams showing an average crank angular acceleration in each cylinder, which is calculated based on the crank angular accelerations shown in FIG. 4.
Figure 5B:
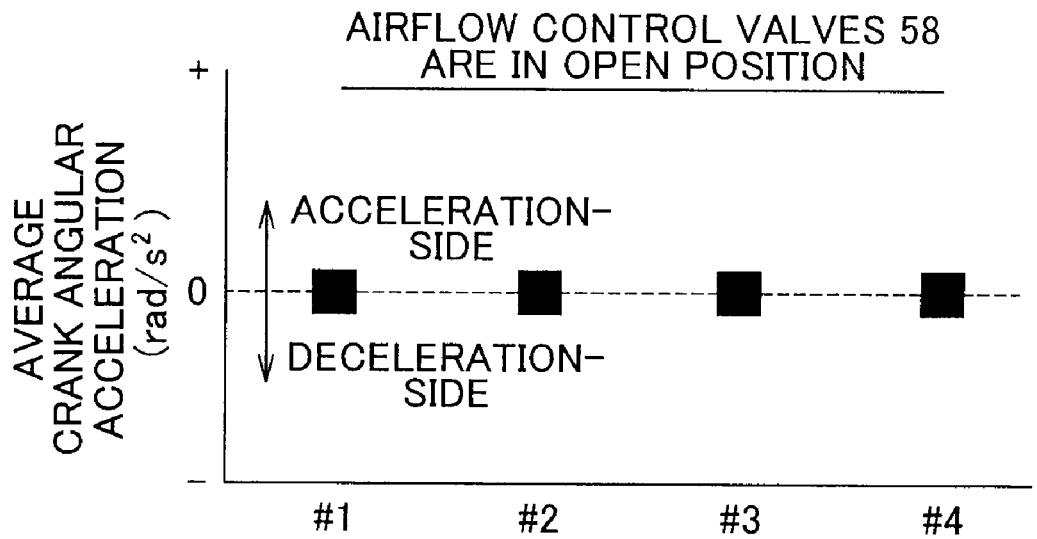

FIGS. 5A and 5B are schematic diagrams showing the average crank angular acceleration in each cylinder, which is calculated based on the crank angular accelerations in each cylinder shown in FIG. 4. More specifically, FIG. 5A shows the calculated average crank angular acceleration in each cylinder when the airflow control valves 58 are controlled to be in the fully-closed position. FIG. 5B shows the calculated average crank angular acceleration in each cylinder when the airflow control valves 58 are controlled to be in the fully-open position. To calculate the average crank angular acceleration, the crank angular acceleration is not necessarily sampled during the entire period in which the airflow control valves 58 are in the fully-closed position, and during the entire period in which the airflow control valves 58 are in the fully-open position as shown in FIG. 4. The crank angular acceleration may be sampled in such an interval that the tendency of the distribution of the crank angular acceleration is sufficiently reflected, during each of the period in which the airflow control valves 58 are in the fully-closed position, and the period in which the airflow control valves 58 are in the fully-open position. More specifically, for example, the average crank angular acceleration may be calculated by averaging the crank angular accelerations sampled in a predetermined time, during each of the period in which the airflow control valves 58 are in the fully-closed position, and the period in which the airflow control valves 58 are in the fully-open position.

As shown in FIG. 5A, when the airflow control valves 58 are in the fully-closed position, the average crank angular acceleration tends to be a negative value in each of the cylinders #1 and #3. In contrast, the average crank angular acceleration tends to be a positive value in each of the cylinders #2 and #4. As shown in FIG. 5B, when the airflow control valves 58 are in the fully-open position, the average crank angular acceleration is substantially zero in each of all the cylinders. In the embodiment, taking the tendency of the average crank angular acceleration, it is determined whether a malfunction occurs in the airflow control valve 58 for each cylinder.

Next, a routine, which is executed by the ECU 1A to determine whether a malfunction occurs in the airflow control valve 58 for each cylinder, will be described in detail with reference to a flowchart shown in FIG. 6. The ECU 1A determines whether a malfunction occurs in the airflow control valve 58 for each cylinder, when the CPU executes the routine shown in the flowchart, based on the programs, for example, the program for controlling the internal combustion engine 50, the crank angular acceleration calculation program, the average crank angular acceleration calculation program, and the malfunction determination program, which are stored in the ROM. The CPU determines whether the internal combustion engine 50 is starting (step 11). When a negative determination is made in step 11, no process in the flowchart needs to be executed, and therefore, the routine ends. When a positive determination is made in step 11, the CPU determines whether a coolant temperature THW is in a predetermined range (step 12). In the embodiment, the predetermined range is set to a temperature range of −10° C. to 60° C. so that it is determined that the internal combustion engine 50 is cold and first idling when the coolant temperature THW is in the predetermined range. When a negative determination is made in step 12, no process in the flowchart needs to be executed, and therefore, the routine ends. When a positive determination is made in step 12, the CPU determines whether an idling condition that the internal combustion engine 50 is idling is satisfied (step 13). In the embodiment, when the internal combustion engine 50 is idling, and accordingly, the operating state of the internal combustion engine 50 is relatively stable, it is determined whether a malfunction occurs in the airflow control valve 58 for each cylinder. Therefore, in step 13, it is determined whether the idling condition is satisfied. When a negative determination is made in step 13, no process in the flowchart needs to be executed, and therefore, the routine ends.

When a positive determination is made in step 13, the CPU determines whether the airflow control valves 58 are controlled to be in the fully-closed position (step 14). When a positive determination is made in step 14, the CPU calculates the average crank angular acceleration in each cylinder (step 15). Then, the CPU determines whether the average crank angular acceleration is negative and lower than a predetermined value in each cylinder (step 16). In the embodiment, the predetermined value is set to −100 [rad/s$^2$]. When a negative determination is made in step 16, the CPU determines that the airflow control valves 58 normally function (step 17). When the average crank angular acceleration is negative and lower than the predetermined value in at least one cylinder, an affirmative determination is made in step 16. The CPU temporarily determines that a malfunction occurs in at least one airflow control valve 58 for the at least one cylinder (step 18).

When the routine shown in the flowchart is executed during the period in which the internal combustion engine 50 is cold and first idling, and the airflow control valves 58 are controlled to be in the fully-open position, affirmative determinations are made in steps 11 to 13, and then, a negative determination is made in step 14. Thus, processes in step 21 and subsequent steps are executed. The airflow control valves 58 may be appropriately controlled to be in the fully-open position when it is temporarily determined that a malfunction occurs in at least one airflow control valve 58 in step 18. When a negative determination is made in step 14, the CPU calculates the average crank angular acceleration in each cylinder (step 21). Then, the CPU determines whether the average crank angular acceleration is negative and lower than the predetermined value (step 22). In the embodiment, the predetermined value is set to −100 [rad/s$^2$].

When an affirmative determination is made in step 22, the combustion state is deteriorated although the airflow control valves 58 do not function. Accordingly, when an affirmative determination is made in step 22, the CPU determines that a malfunction occurs in a component other than the airflow control valves 58 (step 24). When a negative determination is made in step 22, first, the CPU determines whether it is temporarily determined that a malfunction occurs in at least one airflow control valve 58 in step 18 (step 23). When a negative determination is made in step 23, the CPU ends the routine shown in the flowchart. When a positive determination is made in step 23, the CPU determines that a malfunction actually occurs in the at least one airflow control valve 58 in which it is temporarily determined that a malfunction occurs in step 18 (step 25).

Figure 6:
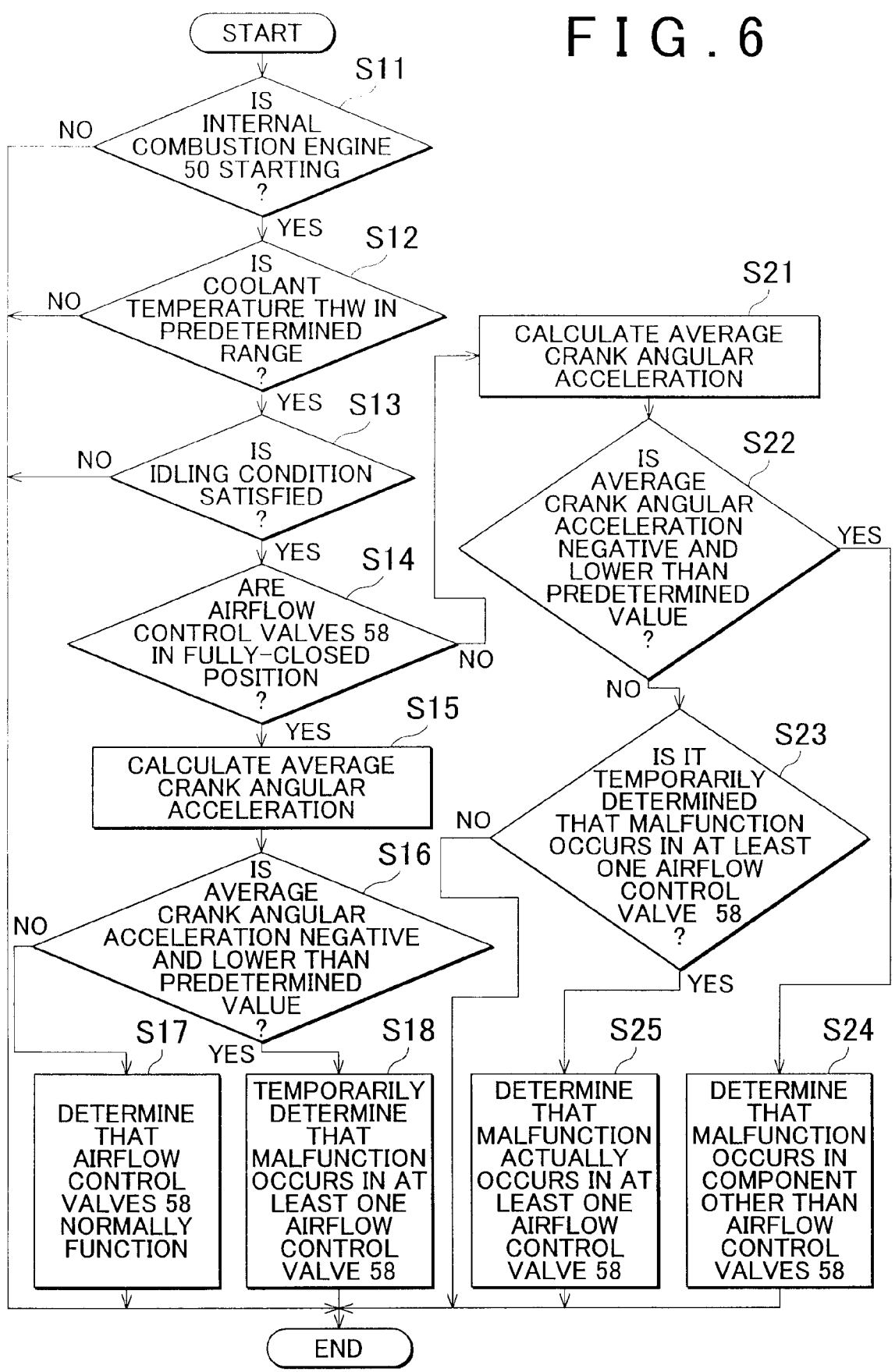
FIG. 6 is a flowchart of a routine executed by the ECU 1A.
Figure 7A:
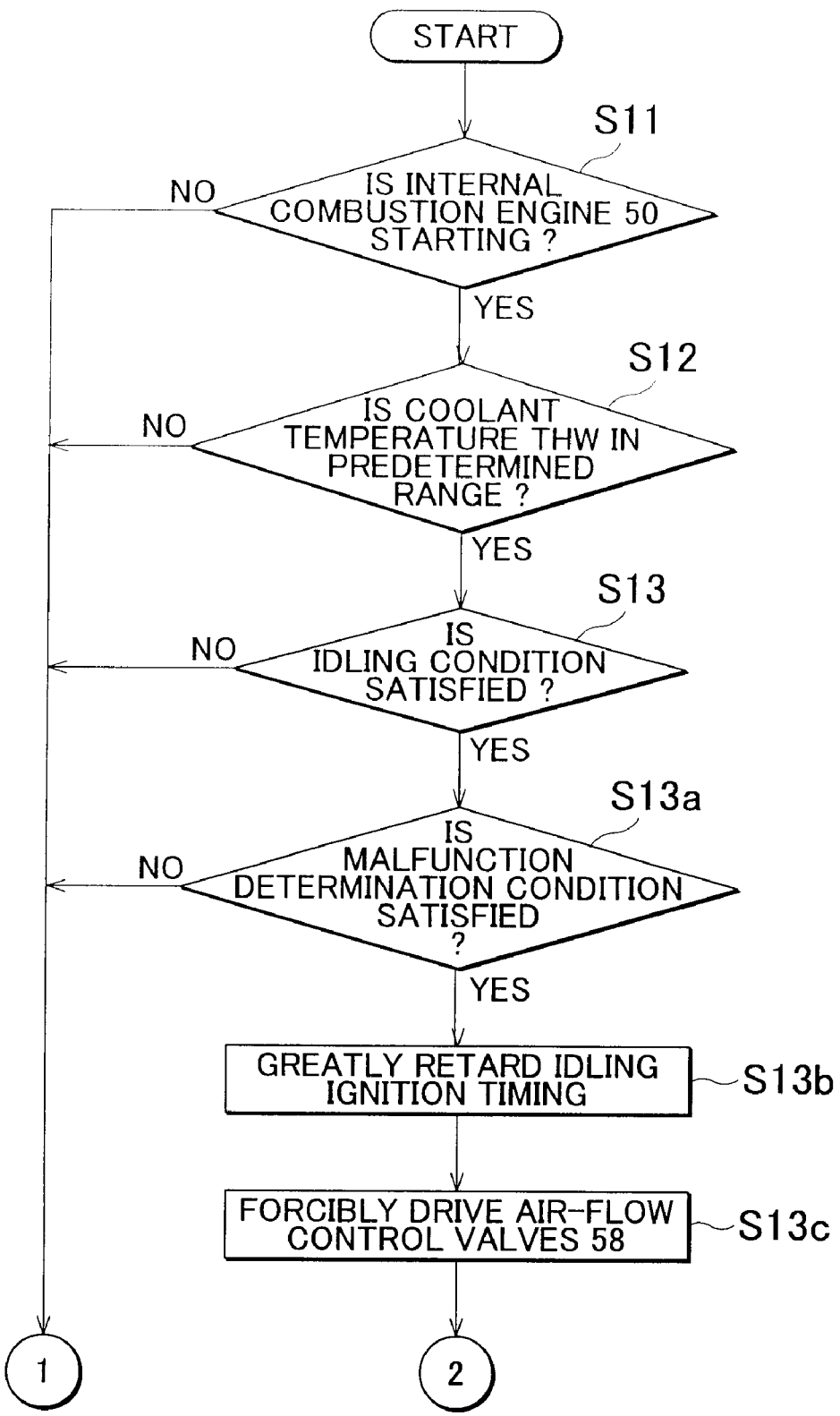
FIGS. 7A and 7B are a flowchart of a routine executed by the ECU 1A to determine whether a malfunction occurs in the airflow control valve for each cylinder, with high determination performance, when an internal combustion engine is warm.
Figure 7B:
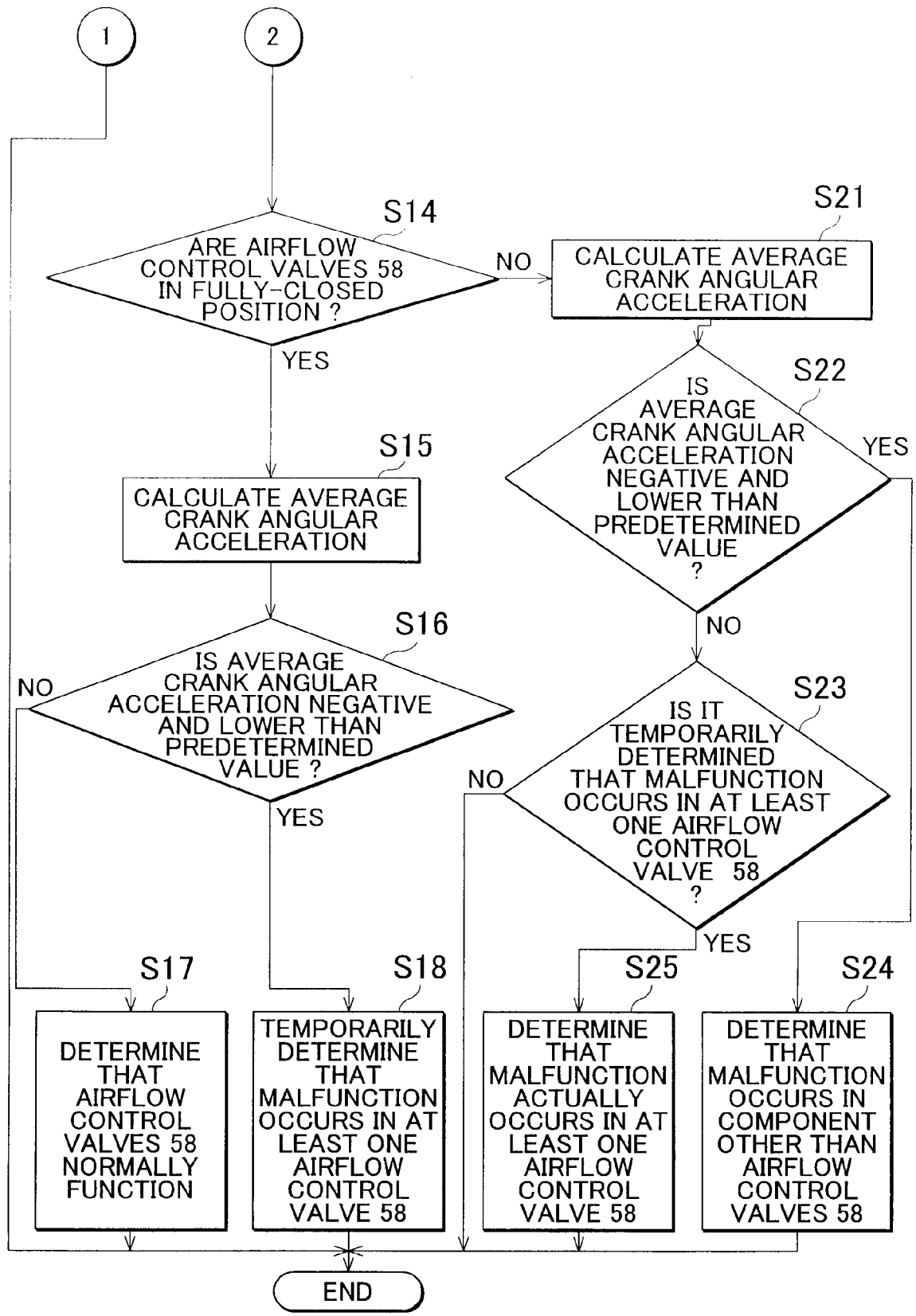

The flowchart shown in FIG. 6 shows the routine for determining whether a malfunction occurs in the airflow control valves 58 when the internal combustion engine 50 is cold and first idling. When the internal combustion engine 50 is warm, the feedback control on the air-fuel ratio is generally executed in the internal combustion engine 50. Therefore, when the internal combustion engine 50 is warm, the combustion state in each cylinder is more stable than when the internal combustion engine 50 is cold and first idling. Accordingly, when the internal combustion engine 50 is warm, it is likely to be difficult to determine whether a malfunction occurs in the airflow control valve 58 for each cylinder. Thus, next, a routine, which is executed by the ECU 1A to determine whether a malfunction occurs in the airflow control valve 58 for each cylinder, with high determination performance, when the internal combustion engine 50 is warm, will be described in detail with reference to a flowchart shown in FIGS. 7A and 7B. The flowchart shown in FIGS. 7A and 7B is the same as the flowchart shown in FIG. 6, except that steps 13a, 13b, and 13c are added after step 13 in the flowchart shown in FIG. 7A. Accordingly, particularly steps 13a, 13b, and 13c in the flowchart shown in FIG. 7A will be described in detail. However, in step 12 in the flowchart shown in FIG. 7A, the predetermined range is set to a temperature range of 60° C. to 90° C. so that it is determined that the internal combustion engine 50 is warm when the coolant temperature THW is in the predetermined range.

After the process in step 13 is executed, the CPU determines whether a malfunction determination condition (i.e., a condition for determining whether a malfunction occurs in the airflow control valve 58 for each cylinder) is satisfied (step 13a). More specifically, for example, the malfunction determination condition includes a condition that a vehicle speed is 0 km/h; a condition that an idling engine speed is in a predetermined range (for example, a target engine speed±25 rpm); a condition that the air-fuel ratio is in a predetermined range (for example, 14.6±0.1 when a target air-fuel ratio is 14.6); a condition that a purge amount of evaporated fuel is in a predetermined range (for example, within 1%) when a purge control on evaporated fuel is executed; a condition that the value of VVT (Variable Valve Timing) is substantially zero when a variable valve operating mechanism VVT is provided; a condition that no malfunction is detected in the sensors such as the crank angle sensor 71; and a condition that no malfunction is detected in diagnostic examination. When a negative determination is made in step S13a, no process in the flowchart needs to be executed, and therefore, the routine ends. When an affirmative determination is made in step S13a, the CPU greatly retards an ignition timing during idling (hereinafter, referred to as "idling ignition timing") (step 13b). More specifically, in the embodiment, the CPU retards the idling ignition timing to 10° ATDC. By greatly retarding the idling ignition timing in this step, the combustion engine in each cylinder is made unstable. Therefore, it is easily determined whether the combustion state is deteriorated in each cylinder based on the average crank angular acceleration. Then, the CPU determines the operating state of the airflow control valves 58. When the airflow control valves 58 are not controlled to be in the fully-closed position, the CPU controls the airflow control valves 58 so that the airflow control valves 58 are in the fully-closed position (step 13c). Thus, an affirmative determination is made in step 14, and the processes in step 15 and subsequent steps are executed to temporarily determine whether a malfunction occurs in at least one airflow control valve 58 for at least one cylinder.

When it is temporarily determined that a malfunction occurs in the at least one airflow control valve 58 in step 18, and then the processes in the flowchart are executed, the CPU determines the operating state of the airflow control valves 58 in step 13c. When the airflow control valves 58 are not controlled to be in the fully-open position, the CPU controls the airflow control valves 58 so that the airflow control valves 58 are in the fully-open position. Thus, a negative determination is made in step 14, and the processes in step 21 and subsequent steps are executed to determine whether a malfunction actually occurs in the at least one airflow control valve 58. In the flowcharts shown in FIG. 6 and FIGS. 7A and 7B, the processes in step 21 and subsequent steps may be executed before the processes in step 15 and subsequent steps are executed. In this case, the malfunction determination program is made such that the process in step 23 is not executed. In addition, in the case where it is confirmed that no malfunction occurs in the airflow control valves 58 when the airflow control valves 58 are in the fully-open position in step 21 and subsequent steps, and an affirmative determination is made in step 16 when the processes in step 15 and subsequent steps are executed, it is determined that a malfunction occurs in at least one airflow control valve 58 for at least one cylinder in which the average crank angular acceleration is negative and lower than the predetermined value. Thus, it is possible to implement the ECU 1A that determines whether a malfunction occurs in the airflow control valve 58 for each cylinder, with low cost, and with high determination performance.

Second Embodiment

An ECU 1B according to a second embodiment is the same as the ECU 1A according to the first embodiment, except that the malfunction determination program includes a program for determining whether a malfunction occurs in the airflow control valve 58 for each cylinder, based on the length of a trajectory showing variation in the crank angular acceleration (hereinafter, simply referred to as "trajectory length") in a predetermined time after the internal combustion engine 50 starts, instead of the average crank angular acceleration. Because the temperatures of the air-fuel ratio sensor 23 and the oxygen sensor 24 do not reach respective activation temperatures at which the air-fuel ratio sensor 23 and the oxygen sensor 24 are activated, in the predetermined time after the internal combustion engine 50 starts, the feedback control on the air-fuel ratio is not executed in the predetermined time. In this case, particularly in the cylinder in which the combustion state is deteriorated, the combustion state greatly varies, and therefore, the crank angular acceleration greatly varies. As a result, the trajectory length is definitely long in the cylinder in which the combustion state is deteriorated.

Figure 8:
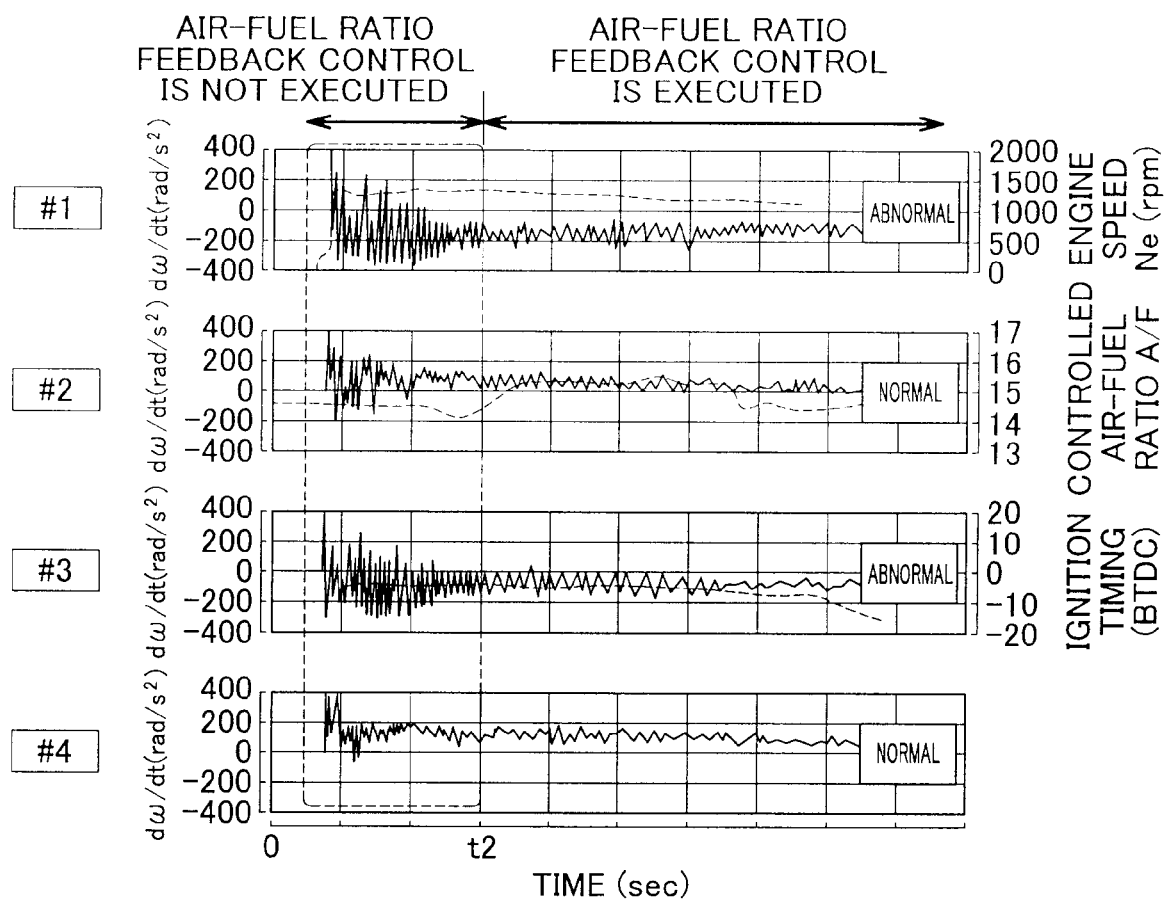
FIG. 8 is a diagram showing how the crank angular acceleration in each cylinder changes with time when a feedback control on an air-fuel ratio, which has not been executed, is executed.

FIG. 8 is a diagram showing how the crank angular acceleration in each cylinder changes with time when the feedback control on the air-fuel ratio, which has not been executed, is executed. In this case, the airflow control valve 58 for each of the cylinders #1 and #3 is removed from the intake port 52a to simulate the situation where a malfunction occurs in the airflow control valve 58. In this situation, the feedback control on the air-fuel ratio is not executed until time t2. Then, the feedback control on the air-fuel ratio is executed. When the feedback control on the air-fuel ratio is not executed, the crank angular acceleration in each of the cylinders #1 and #3 greatly varies. In contrast, the variation in the crank angular acceleration in each of the cylinders #2 and #4 is relatively small. When the feedback control on the air-fuel ratio is executed, the crank angular accelerations converge, and the variation in the crank angular acceleration is small in each of all the cylinders.

Figure 9:
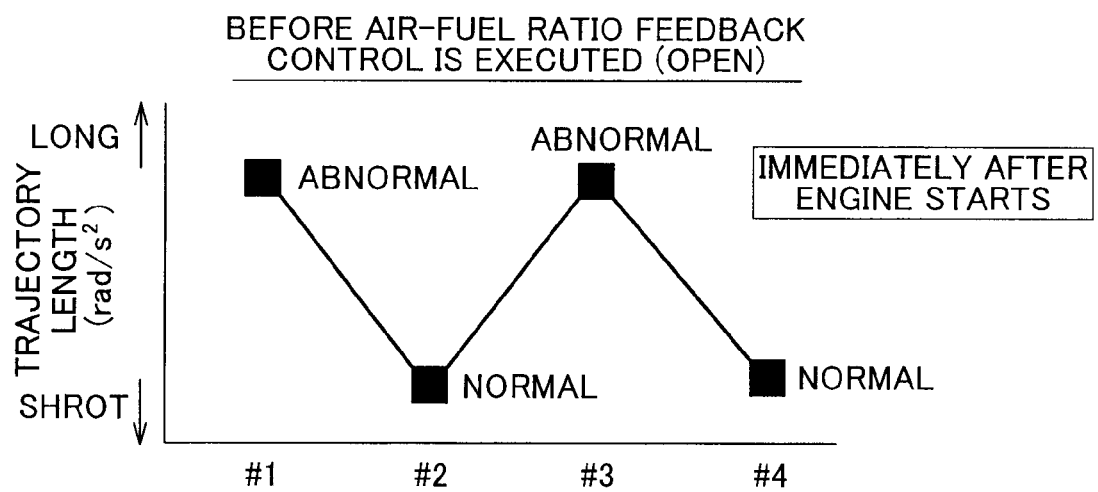
FIG. 9 is a schematic diagram showing a calculated trajectory length relating to each cylinder when the feedback control on the air-fuel ratio is not executed.

FIG. 9 is a schematic diagram showing the calculated trajectory length relating to each cylinder when the feedback control on the air-fuel ratio is not executed. As shown in FIG.

Figure 10:
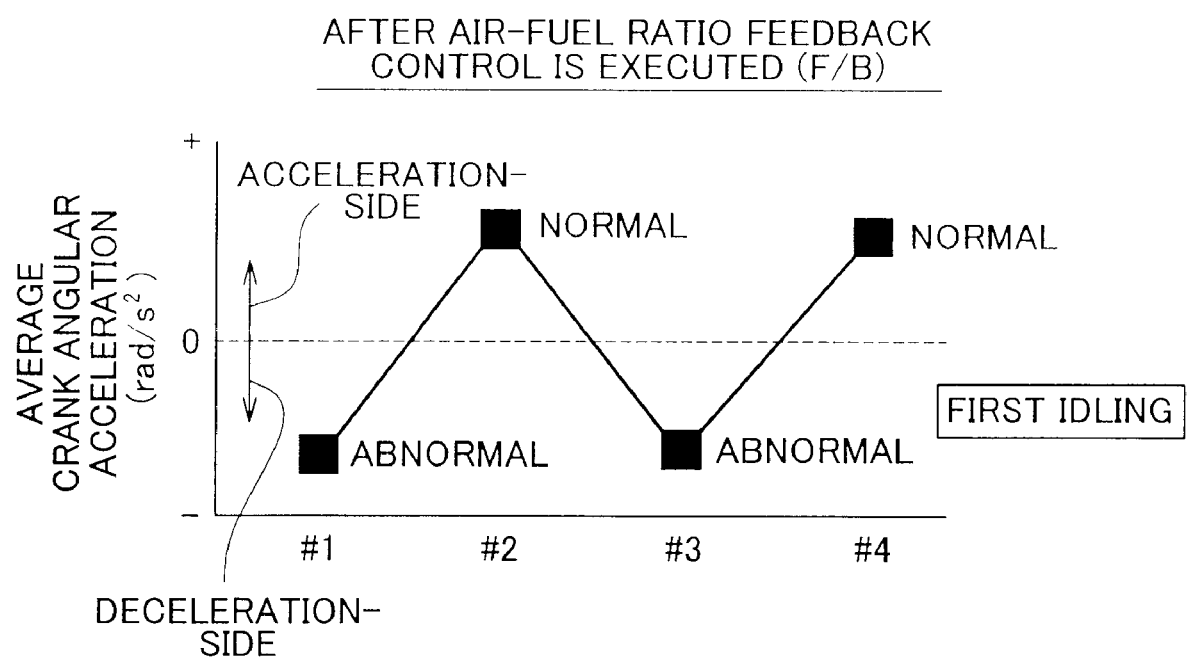
FIG. 10 is a schematic diagram showing a calculated average crank angular acceleration in each cylinder when the feedback control on the air-fuel ratio is executed.

9, the trajectory length relating to each of the cylinders #1 and #3 is longer than the trajectory length relating to each of the cylinders #2 and #4. When the feedback control on the air-fuel ratio is executed, the combustion state is stabilized in each cylinder, and therefore, a significant difference in the trajectory length between a normal cylinder and a malfunctioning cylinder is small. Therefore, in the embodiment, when the feedback control on the air-fuel ratio is executed, it is determined whether a malfunction occurs in the airflow control valve 58 for each cylinder, by calculating the average crank angular acceleration in each cylinder, as shown in FIG. 10. As shown in FIG. 10, when the feedback control on the air/fuel ratio is executed, the average crank angular acceleration tends to be a negative value in each of the cylinders #1 and #3, and the average crank angular acceleration tends to be a positive value in each of the cylinders #2 and #4. On the basis of this result of analysis, in the embodiment, when the feedback control on the air-fuel ratio is not executed, it is determined whether a malfunction occurs in the airflow control valve 58 for each cylinder, with high determination performance, taking into account the difference in the trajectory length.

Figure 11:
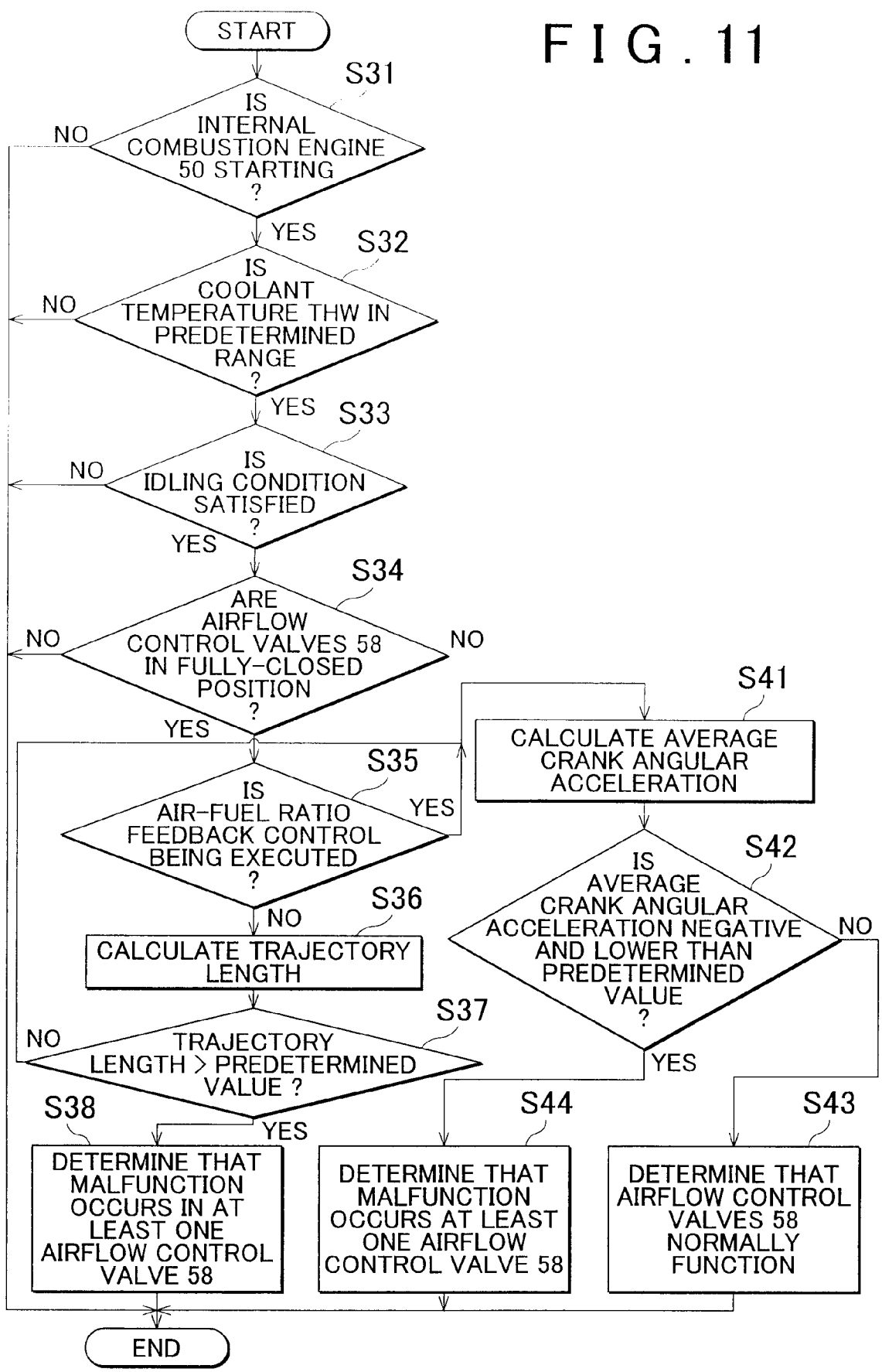
FIG. 11 is a flowchart of a routine executed by an ECU 1B.
Figure 12:
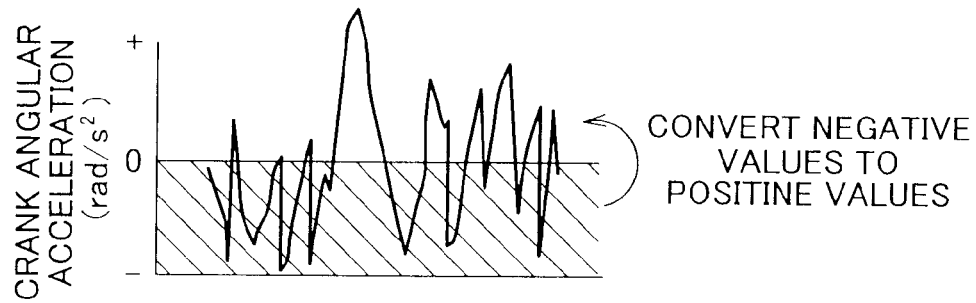
FIG. 12 is a schematic diagram showing a method of calculating the trajectory length.

Next, a routine, which is executed by the ECU 1B to determine whether a malfunction occurs in the airflow control valve 58 for each cylinder, will be described in detail with reference to a flowchart shown in FIG. 11. Steps 31 to 33 are the same as steps 11 to 13 in the flowchart shown in FIG. 6, and therefore, the description thereof will be omitted. When an affirmative determination is made in step 33, the CPU determines whether the airflow control valves 58 are controlled to be in the fully-closed position (step 34). When a negative determination is made in step 34, no process in the flowchart needs to be executed, and therefore, the routine ends. When an affirmative determination is made in step 34, the CPU determines whether the feedback control on the air-fuel ratio is being executed (step 35). When a negative determination is made in step 35, the CPU calculates the trajectory length relating to each cylinder (step 36). FIG. 12 is a schematic diagram showing a method of calculating the trajectory length. The trajectory length is calculated by converting the negative values of the crank angular acceleration to positive values, and then accumulating the values of the crank angular acceleration.

After the process in step 36 is executed, the CPU determines whether the trajectory length relating to each cylinder is longer than a predetermined value (step 37). In the embodiment, the predetermined value is set to 1000 [rad/s$^2$]. When an affirmative determination is made in step 37, the CPU determines that a malfunction occurs in at least one airflow control valve 58 (step 38). When a negative determination is made in step 37, the CPU calculates the average crank angular acceleration in each cylinder (step 41). That is, in the embodiment, when it is determined that no malfunction occurs in the airflow control valves 58 based on the trajectory length in each cylinder, it is further determined whether a malfunction occurs in the airflow control valve 58 for each cylinder, based on the average crank angular acceleration. Thus, because double checks are performed, it is possible to increase the performance of determining whether a malfunction occurs in the airflow control valve for each cylinder. When an affirmative determination is made in step 35, the process in step 41 is executed. Then, the CPU determines whether the average crank angular acceleration is negative and lower than the predetermined value in each cylinder (step 42). In the embodiment, the predetermined value is set to −100 [rad/s$^2$].

When a negative determination is made in step 42, it is determined that the combustion state is not deteriorated. Therefore, when a negative determination is made in step 42, the CPU determines that the airflow control valves 58 normally function (step 43). When it is determined that the average crank angular acceleration is negative and lower than the predetermined value in at least one cylinder, an affirmative determination is made in step 42. In this case, the CPU determines that a malfunction occurs in at least one airflow control valve 58 for the at least one cylinder (step 44). In the embodiment, for the sake of convenience, it is determined that a malfunction occurs in the at least one airflow control valve 58 in each of step 38 and step 44. However, it may be temporarily determined that a malfunction occurs in the at least one airflow control valve 58 in each of step 38 and step 44. In this case, when a negative determination is made in step 34, the processes in steps 21 to 24 are executed as in the first embodiment. In this manner, it is more accurately determined whether a malfunction occurs in the airflow control valve 58 for each cylinder. Thus, it is possible to implement the ECU 1B that determines whether a malfunction occurs in the airflow control valve 58 for each cylinder, with low cost, and with high determination performance.

Third Embodiment

An ECU 1C according to a third embodiment is the same as the ECU 1A according to the first embodiment, except that an idling ignition timing feedback control program for executing a feedback control on the idling ignition timing is stored in the ROM. When the airflow control valve 58 for each cylinder normally functions during the period in which the internal combustion engine 50 is cold and first idling, the engine speed Ne is maintained at the target engine speed. When a malfunction occurs in at least one airflow control valve 58 for at least one cylinder, the engine speed Ne decreases from the target engine speed, according to the degree of the malfunction. Further, because the crank angular velocity decreases due to the decrease in the engine speed Ne, the crank angular acceleration, which is the amount of change in the crank angular velocity, also decreases. That is, the decrease in the engine speed Ne decreases the accuracy with which it is determined whether a malfunction occurs in the airflow control valve 58 for each cylinder based on the crank angular acceleration.

Figure 13:
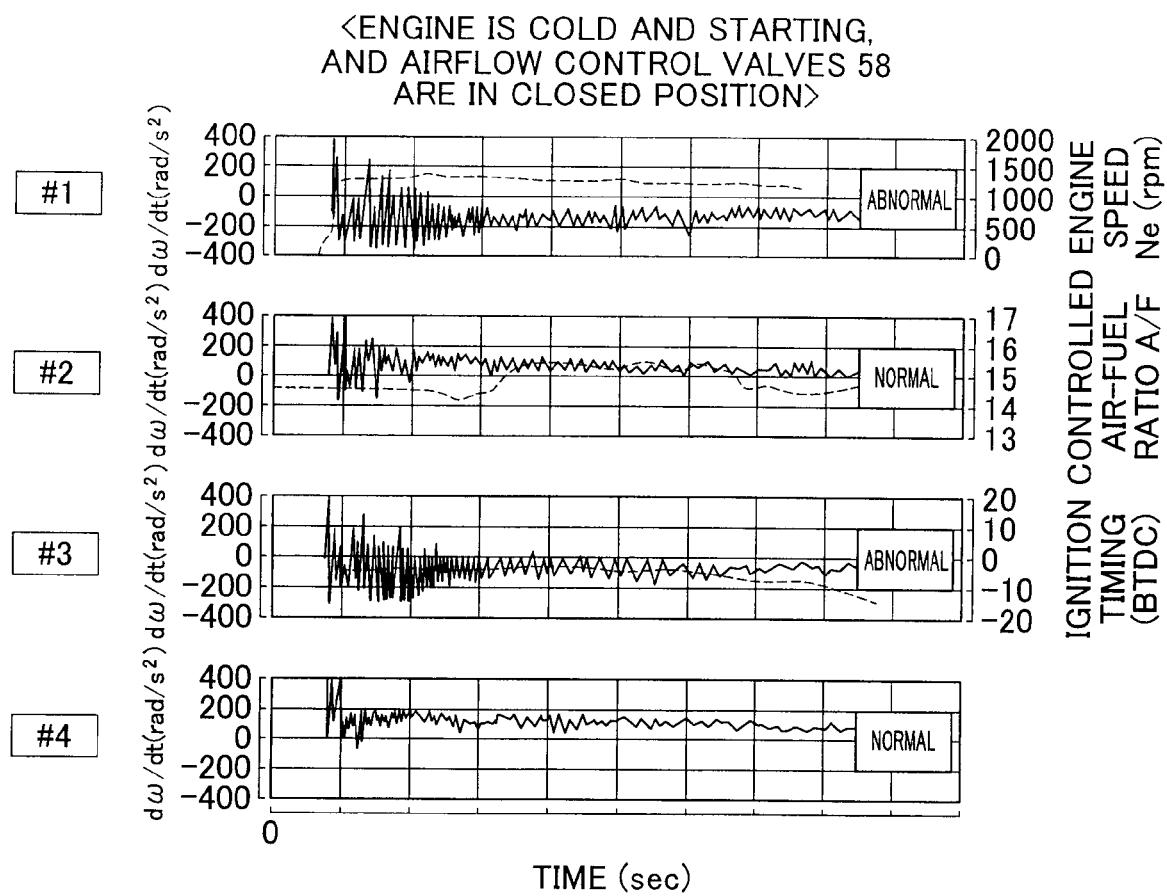
FIG. 13 is a diagram showing how the crank angular acceleration in each cylinder changes with time.
Figure 14A:
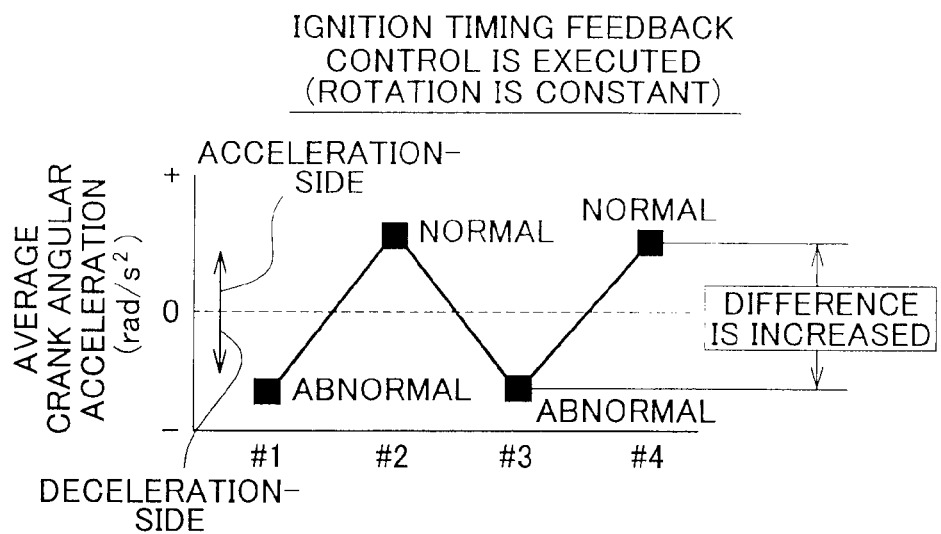
FIGS. 14A and 14B are schematic diagrams showing the average crank angular acceleration in each cylinder, which is calculated based on the crank angular accelerations shown in FIG. 13.
Figure 14B:
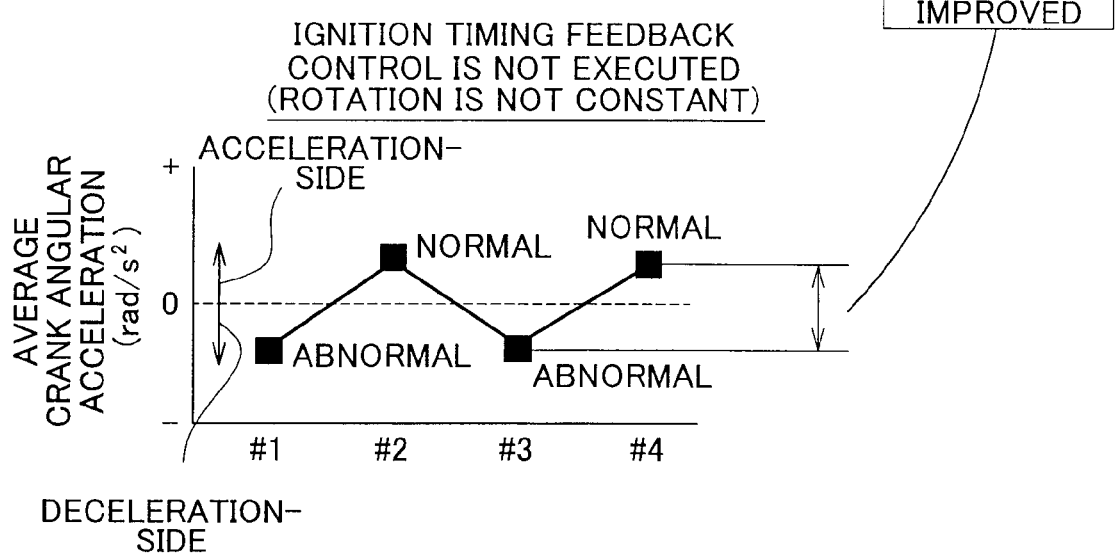

FIG. 13 is a diagram showing how the crank angular acceleration in each cylinder changes with time. In this case, the airflow control valve 58 for each of the cylinders #1 and #3 is removed from the intake port 52a to simulate the situation where a malfunction occurs in the airflow control valve 58. FIGS. 14A and 14B are schematic diagrams showing the average crank angular acceleration in each cylinder, which is calculated based on the crank angular accelerations in each cylinder shown in FIG. 13. More specifically, FIG. 14A shows the average crank angular acceleration when the feedback control on the idling ignition timing is executed. FIG. 14B shows the average crank angular acceleration when the feedback control on the idling ignition timing is not executed. As shown in FIGS. 14A and 14B, by executing the feedback control on the idling ignition timing, the S/N ratio is improved, and thus, the difference between the normal value of the average crank angular acceleration, and the abnormal value of the average crank angular acceleration is increased.

Figure 15:
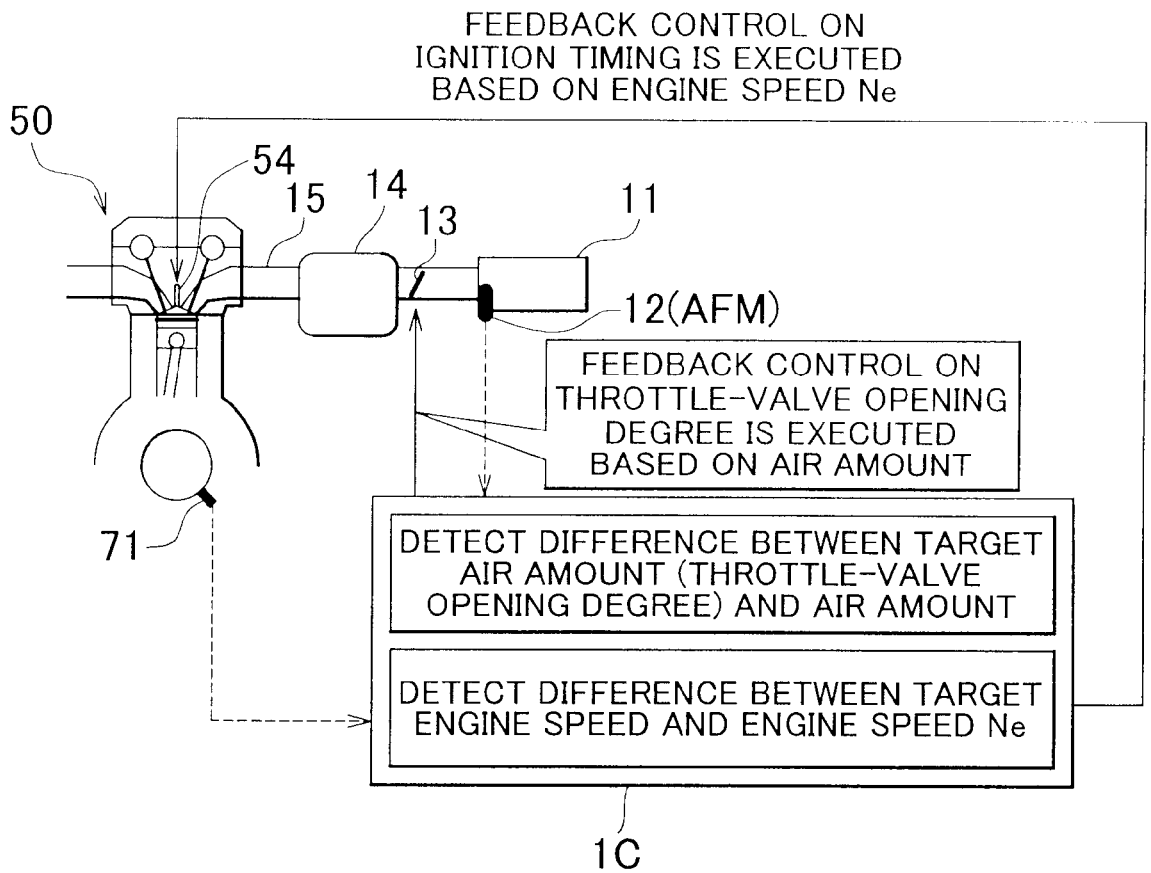
FIG. 15 is a schematic diagram showing a feedback control on an idling ignition timing.
Figure 16A:
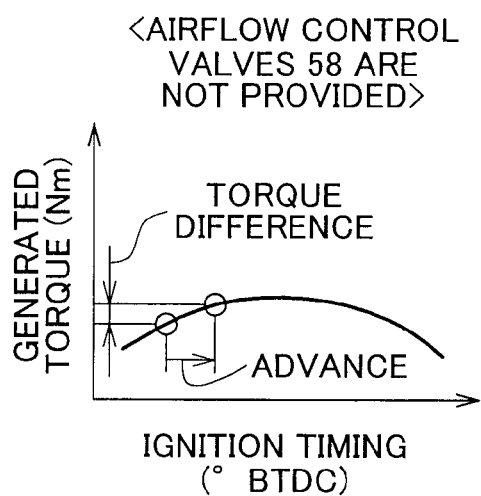
FIGS. 16A and 16B are diagrams showing the characteristic of torque generated in the internal combustion engine with respect to the idling ignition timing.
Figure 16B:
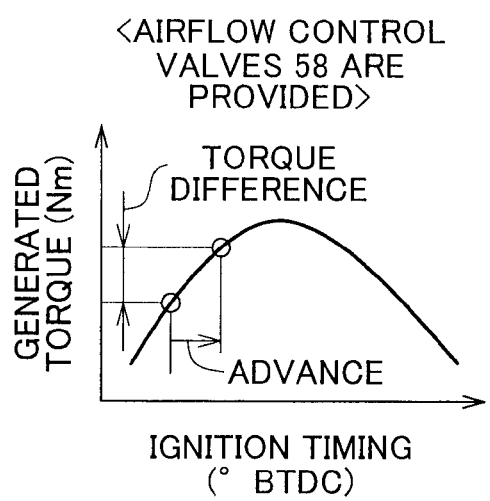

FIG. 15 is a schematic diagram showing the feedback control on the idling ignition timing. When the feedback control on the idling ignition timing is executed, first, the engine speed Ne is detected based on the signal output from the crank angle sensor 71, and further the difference between the target engine speed and the engine speed Ne is calculated. On the basis of the difference, the feedback control on the idling ignition timing is executed to change the idling ignition timing so that the engine speed Ne is equal to the target engine speed. As shown in FIG. 15, the difference between a target air amount and an air amount determined based on the signal output from the airflow meter 12 may be calculated, and a feedback control on a throttle-valve opening degree may be executed based on the difference. FIGS. 16A and 16B are diagrams showing the characteristic of torque generated in the internal combustion engine 50 with respect to the idling ignition timing. FIG. 16A shows the characteristic of the torque when the airflow control valve 58 is not provided in the intake passage. FIG. 16B shows the characteristic of the torque when the airflow control valve 58 is provided in the intake passage. In FIGS. 16A and 16B, the engine speed Ne and the air amount are constant. Also, the engine speed Ne and the air amount in FIG. 16A are the same as those in FIG. 16B.

As shown in FIGS. 16A and 16B, when the idling ignition timing is advanced from the same timing in the same manner in the case where the airflow control valve 58 is provided and in the case where the airflow control valve 58 is not provided, the torque is increased in both the cases. However, in the case where the airflow control valve 58 is provided, the difference between the torque before the ignition timing is changed and the torque after the ignition timing is changed is large, as compared to the case where the airflow control valve 58 is not provided. Thus, by appropriately advancing the idling ignition timing, the decrease in the output from the cylinder, in which the combustion state is deteriorated, is compensated for, mainly by the outputs from the other cylinders so that the engine speed Ne is controlled to the target engine speed through feedback. When the throttle-valve opening degree is changed while the idling ignition timing is constant, the difference between the torque before the throttle-valve opening degree is changed and the torque after the throttle-valve opening degree is changed is large in the case where the airflow control valve 58 is provided, as compared to the case where the airflow control valve 58 is not provided. In the embodiment, the idling ignition timing feedback controller is implemented by the CPU and the like, and the idling ignition timing feedback control program. By executing the feedback control on the idling ignition timing to maintain the engine speed Ne at the target engine speed, it is determined whether a malfunction occurs in the airflow control valve 58 for each cylinder, with high determination performance.

Figure 17:
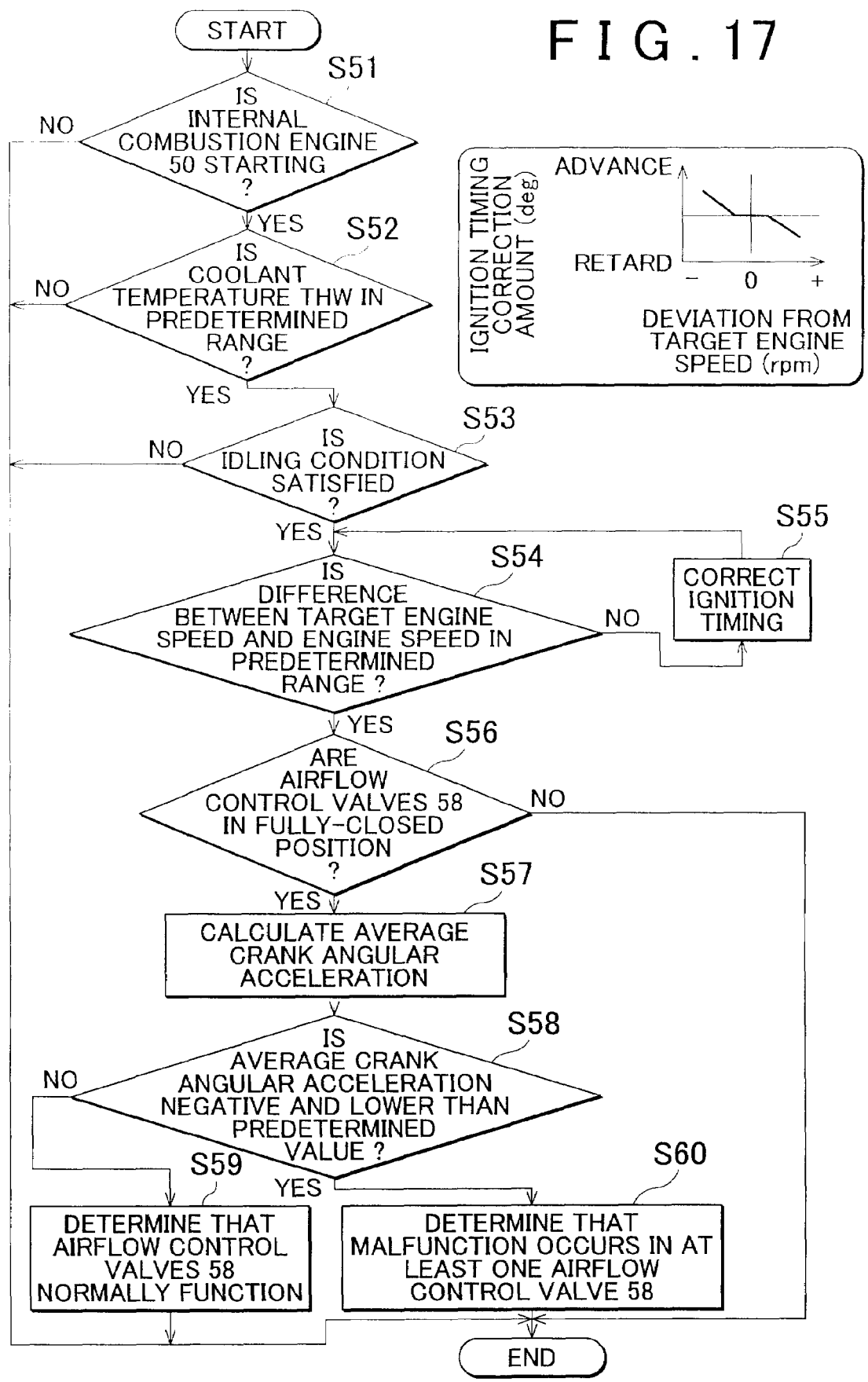
FIG. 17 is a flowchart of a routine executed by an ECU 1C.

Next, a routine, which is executed by the ECU 1C to determine whether a malfunction occurs in the airflow control valve 58 for each cylinder, will be described in detail with reference to a flowchart shown in FIG. 17. Steps 51 to 53 are the same as steps 11 to 13 in the flowchart shown in FIG. 6, and therefore, the description thereof will be omitted. When an affirmative determination is made in step 53, the CPU determines whether the difference between the target engine speed and the engine speed Ne is in a predetermined range (step 54). When a negative determination is made in step 54, the CPU corrects the idling ignition timing (step 55). More specifically, the CPU reads a correction amount by which the idling timing is corrected, referring to map data shown in FIG. 17, based on the difference between the target engine speed and the engine speed Ne. In addition, the CPU corrects the idling ignition timing by the correction amount that is read. In the embodiment, the map data is stored in the ROM. Step 55 is repeatedly executed until an affirmative determination is made in step 54. Thus, the engine speed Ne is controlled to the target engine speed through feedback.

When an affirmative determination is made in step 54, the CPU determines whether the airflow control valves 58 are controlled to be in the fully-closed position (step 56). When a negative determination is made in step 56, no process in the flowchart needs to be executed, and therefore, the routine ends. When an affirmative determination is made in step 56, the CPU calculates the average crank angular acceleration in each cylinder (step 57). Then, the CPU determines whether the average crank angular acceleration is negative and lower than the predetermined value in each cylinder (step 58). In the embodiment, the predetermined value is set to −100 [rad/s$^2$]. When a negative determination is made in step 58, the combustion state is not deteriorated. Accordingly, when a negative determination is made in step 58, the CPU determines that the airflow control valves 58 normally function (step 59).

When it is determined that the average crank angular acceleration is negative and lower than the predetermined value in at least one cylinder in step 58, an affirmative determination is made in step 58. Then, the CPU determines that a malfunction occurs in at least one airflow control valve 58 for the at least one cylinder (step 60). In the embodiment, it is determined that a malfunction occurs in the at least one airflow control valve 58 in step 60. However, it may be temporarily determined that a malfunction occurs in the at least one airflow control valve 58 in step 60. In this case, when a negative determination is made in step 56, the processes in steps 21 to 24 are executed as in the first embodiment. In this manner, it is more accurately determined whether a malfunction occurs in the airflow control valve 58 for each cylinder. Thus, it is possible to implement the ECU 1C that determines whether a malfunction occurs in the airflow control valve 58 for each cylinder, with low cost, and with high determination performance.

Fourth Embodiment

An ECU 1D according to a fourth embodiment is the same as the ECU 1A according to the first embodiment, except that a first opening cross-sectional area estimation program is further stored in the ROM, and the malfunction determination program further includes a program for determining whether a malfunction occurs in the airflow control valve 58 for each cylinder, based on the opening cross-sectional area of the intake passage estimated based on the first opening cross-sectional area estimation program, instead of the average crank angular acceleration. More specifically, the first opening cross-sectional area estimation program is made such that when the airflow control valves 58 are operated (i.e., when the airflow control valves 58 are controlled to be in the fully-closed position in the embodiment), the opening cross-sectional area of the intake passage for each cylinder is estimated based on the average crank angular acceleration. The opening cross-sectional area of the intake passage when the airflow control valve 58 is in the fully-closed position is substantially equivalent to the opening cross-sectional area of the notch portion 58a.

For example, a malfunction due to the deformation of the airflow control valve 58 is a relatively minor malfunction. Therefore, high determination performance is required to determine whether such a minor malfunction occurs in the airflow control valve 58 for each cylinder. However, the average crank angular acceleration is likely to vary among internal combustion engine systems 100 with the same configuration due to manufacturing tolerance, or the like. Therefore, for example, if it is determined whether a malfunction occurs in the airflow control valve 58 for each cylinder by comparing the average crank angular acceleration in each cylinder with a determination reference value when the airflow control valves 58 are controlled to be in the fully-closed position, it may be erroneously determined that no malfunction occurs in the airflow control valve 58 in which a malfunction actually occurs due to, for example, the deformation of the airflow control valve 58.

Figure 18:
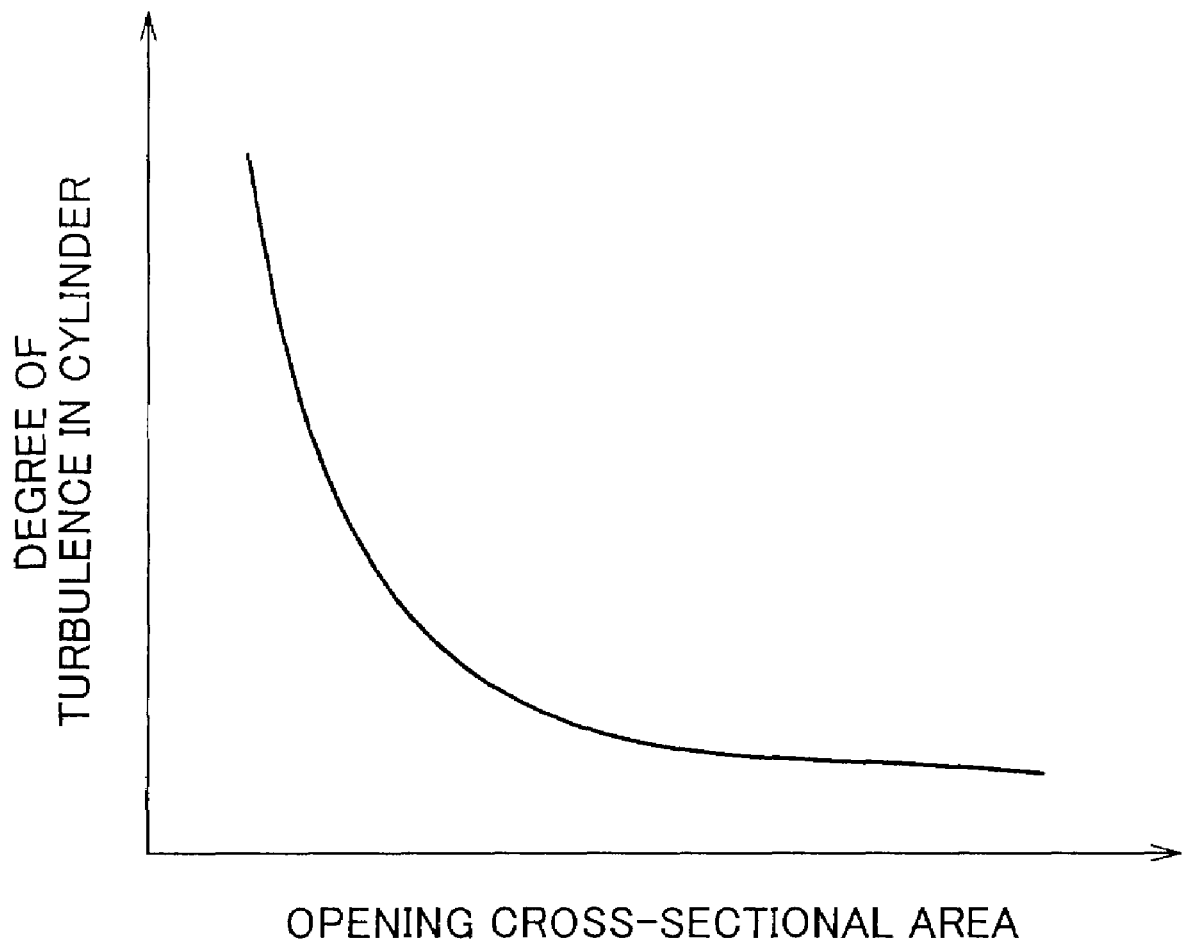
FIG. 18 is a diagram showing the relation between the degree of turbulence in the cylinder and an opening cross-sectional area of an intake passage.

In contrast, the combustion state is generally correlated with the opening cross-sectional area of the intake passage. FIG. 18 is a diagram showing the relation between the degree of turbulence in the cylinder and the opening cross-sectional area of the intake passage. In general, the degree of turbulence in the cylinder is determined based on the opening cross-sectional area of the intake passage, as shown in FIG. 18. As shown in FIG. 18, as the opening cross-sectional area of the intake passage decreases, the degree of turbulence in the cylinder increases. As the opening cross-sectional area of the intake passage increases, the degree of turbulence in the cylinder decreases. The degree of turbulence in the cylinder indicates the level of mixing of air and the fuel, and accordingly, indicates the combustion state. Thus, when the correlation between the average crank angular acceleration, which also indicates the combustion state, and the opening cross-sectional area of the intake passage is determined in each internal combustion engine system 100, the opening cross-sectional area of the intake passage is estimated based on the average crank angular acceleration.

Because the opening cross-sectional area of the intake passage is estimated based on the average crank angular acceleration, it is determined whether a malfunction occurs in the airflow control valve 58 for each cylinder by comparing the estimated opening cross-sectional area of the intake passage with a common determination reference value, instead of comparing the average crank angular acceleration with a determination reference value set in each internal combustion engine system 100. In addition, the estimated opening cross-sectional area of the intake passage is effectively used in the other control or the like. More specifically, for example, when a control is switched to another control for dealing with a malfunction, the opening cross-sectional area of the intake passage is used in the other control so that the other control is more appropriately executed. Thus, in the ECU 1D, map data made by determining in advance the correlation between the opening cross-sectional area of the intake passage and the average crank angular acceleration (hereinafter, simply referred to as "first opening cross-sectional area map") is stored in the ROM. In the embodiment, the opening cross-sectional area estimator is implemented by the CPU and the like, and the first opening cross-sectional area estimation program. Based on the opening cross-sectional area of the intake passage estimated based on the average crank angular acceleration, instead of the average crank angular acceleration, it is determined whether a malfunction occurs in the airflow control valve 58 for each cylinder, with high determination performance.

Figure 19:
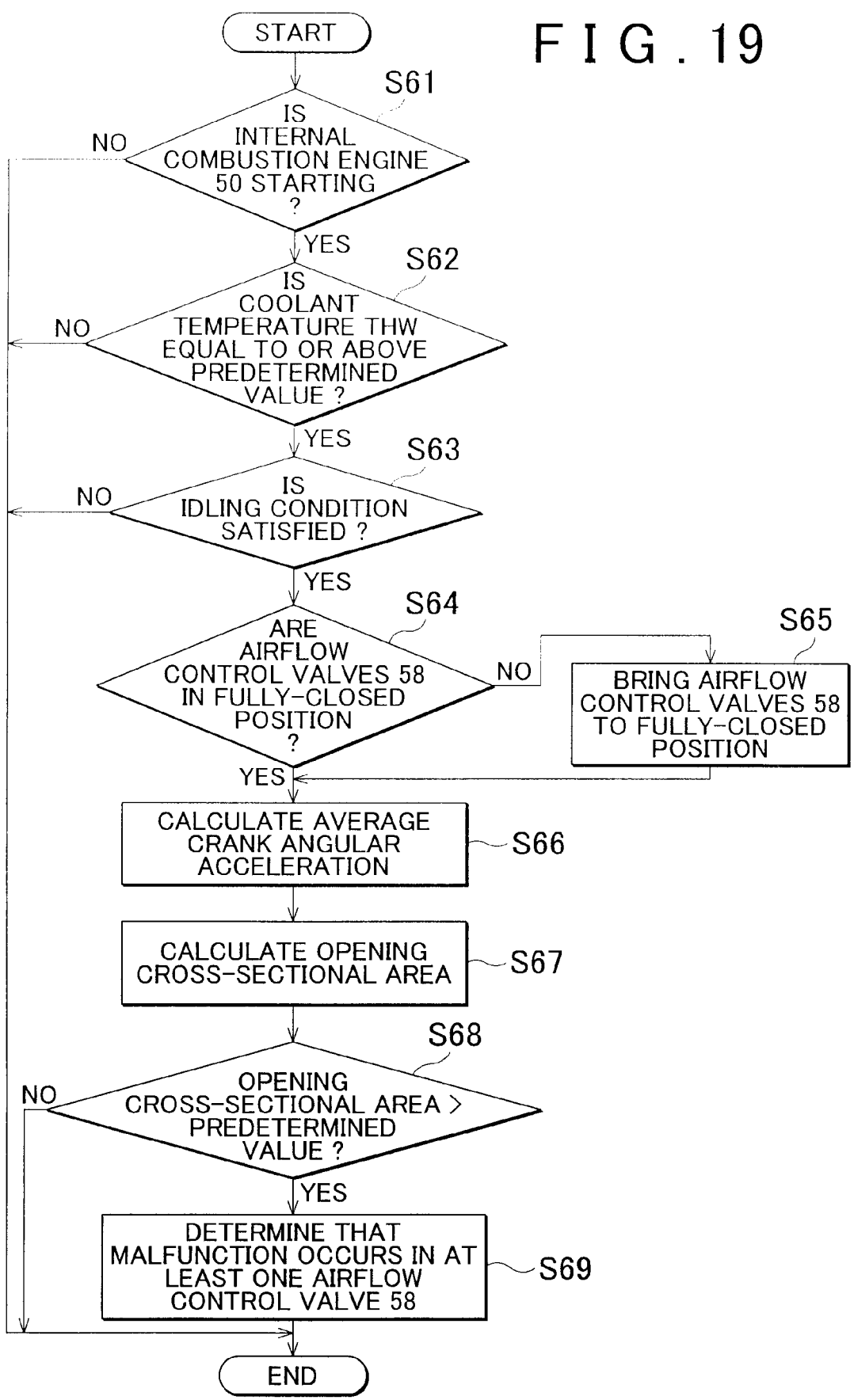
FIG. 19 is a flowchart of a routine executed by an ECU 1D.

Next, a routine, which is executed by the ECU 1D to determine whether a malfunction occurs in the airflow control valve 58 for each cylinder, will be described in detail with reference to a flowchart shown in FIG. 19. The CPU determines whether the internal combustion engine 50 is starting (step 61). When an affirmative determination is made in step 61, the CPU determines whether the coolant temperature THW is equal to or above a predetermined value (step 62). In the embodiment, the predetermined value is set to 80° C. When an affirmative determination is made in step 62, the CPU determines whether the idling condition is satisfied (step 63). When negative determinations are made in steps 61 to 63, no process in the flowchart needs to be executed, and therefore, the routine ends. When an affirmative determination is made in step 63, the CPU determines whether the airflow control valves 58 are controlled to be in the fully-closed position (step 64). When a negative determination is made in step 64, the CPU controls the airflow control valves 58 so that the airflow control valves 58 are in the fully-closed position (step 65).

After the process in step 65 is executed, or when an affirmative determination is made in step 64, the CPU calculates the average crank angular acceleration in each cylinder (step 66). Then, the CPU calculates the opening cross-sectional area of the intake passage for each cylinder, based on the average crank angular acceleration calculated in step 65, referring to the first opening cross-sectional area map (step 67). Then, the CPU determines whether the opening cross-sectional area is larger than a predetermined value (step 68). When a negative determination is made in step 68, no malfunction occurs in the airflow control valves 58, and therefore, the routine ends. When an affirmative determination is made in step 68, the CPU determines that a malfunction occurs in at least one airflow control valve 58 (step 69). In the embodiment, it is determined that a malfunction occurs in the at least one airflow control valve 58 in step 69. However, it may be temporarily determined that a malfunction occurs in the at least one airflow control valve 58. In this case, when a negative determination is made in step 64, the processes in steps 21 to 24 are executed as in the first embodiment, instead of executing the process in step 65. In this manner, it is more accurately determined whether a malfunction occurs in the airflow control valve 58 for each cylinder. Thus, it is possible to implement the ECU ID that determines whether a malfunction occurs in the airflow control valve 58 for each cylinder, with low cost and with high determination performance.

Fifth Embodiment

An ECU 1E according to a fifth embodiment is the same as the ECU 1A according to the first embodiment, except that an average crank angular acceleration learning program is further stored in the ROM, and the malfunction determination program includes a program for determining whether a malfunction occurs in the airflow control valve 58 for each cylinder, based on the degree of deviation from the initial value of the average crank angular acceleration learned based on the average crank angular acceleration learning program, instead of the average crank angular acceleration. More specifically, the average crank angular acceleration learning program is made such that the average crank angular acceleration in each cylinder is calculated when the airflow control valves 58 are operated, that is, when the airflow control valves 58 are controlled to be in the fully-closed position during steady operation (for example, during idling), and the calculated average crank angular acceleration in each cylinder is learned. The average crank angular acceleration is learned, for example, each time the internal combustion engine 50 starts.

Figure 20:
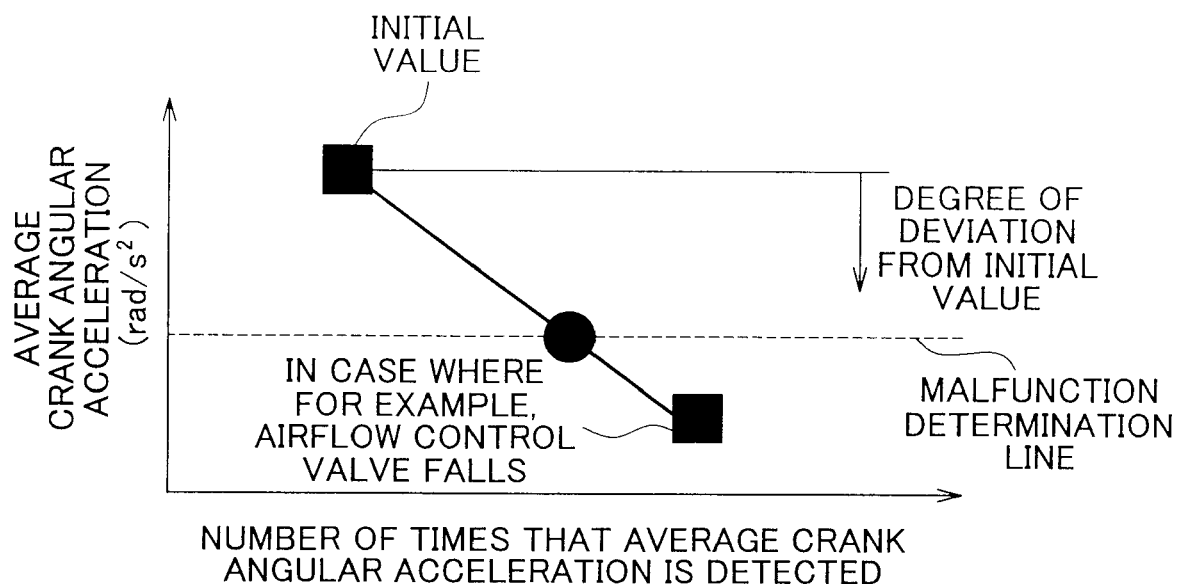
FIG. 20 is a diagram showing the relation between the average crank angular acceleration and the number of times that the average crank angular acceleration is detected, when the opening cross-sectional area of the intake passage is increased due to the gradual deformation of the airflow control valve.

FIG. 20 is a diagram showing the relation between the average crank angular acceleration and the number of times that the average crank angular acceleration is detected, when the opening cross-sectional area of the intake passage is increased due to the gradual deformation of the airflow control valve 58. In FIG. 20, the average crank angular acceleration in one cylinder is calculated when the airflow control valve 58 for the one cylinder is in the fully-closed position. When the opening cross-sectional area of the intake passage is increased due to the gradual deformation of the airflow control valve 58, the combustion state is gradually deteriorated. As a result, the average crank angular acceleration is gradually decreased with an increase in the number of times that the average crank angular acceleration is detected.

Accordingly, it is determined whether a malfunction occurs in the airflow control valve 58 for each cylinder, based on the degree of deviation from the initial value of the average crank angular acceleration. Because it is determined whether a malfunction occurs in the airflow control valve 58 for each cylinder based on the degree of deviation from the initial value of the average crank angular acceleration, it is possible to prevent an erroneous determination as to whether a malfunction occurs in the airflow control valve 58 for each cylinder when the initial value of the average crank angular acceleration varies due to manufacturing tolerance or the like. It is possible to determine that a malfunction occurs in the airflow control valve 58 based on the degree of deviation, not only when the airflow control valve 58 changes with time, but also when the airflow control valve 58 is suddenly deformed or broken, or falls. In this case, the average crank angular acceleration may be learned in shorter time intervals. In the embodiment, the crank angular acceleration learning device is implemented by the CPU and the like, and the crank angular acceleration learning program. Based on the degree of deviation from the initial value of the average crank angular acceleration, instead of the average crank angular acceleration, it is determined whether a malfunction occurs in the airflow control valve 58 for each cylinder, with high determination performance.

Figure 21:
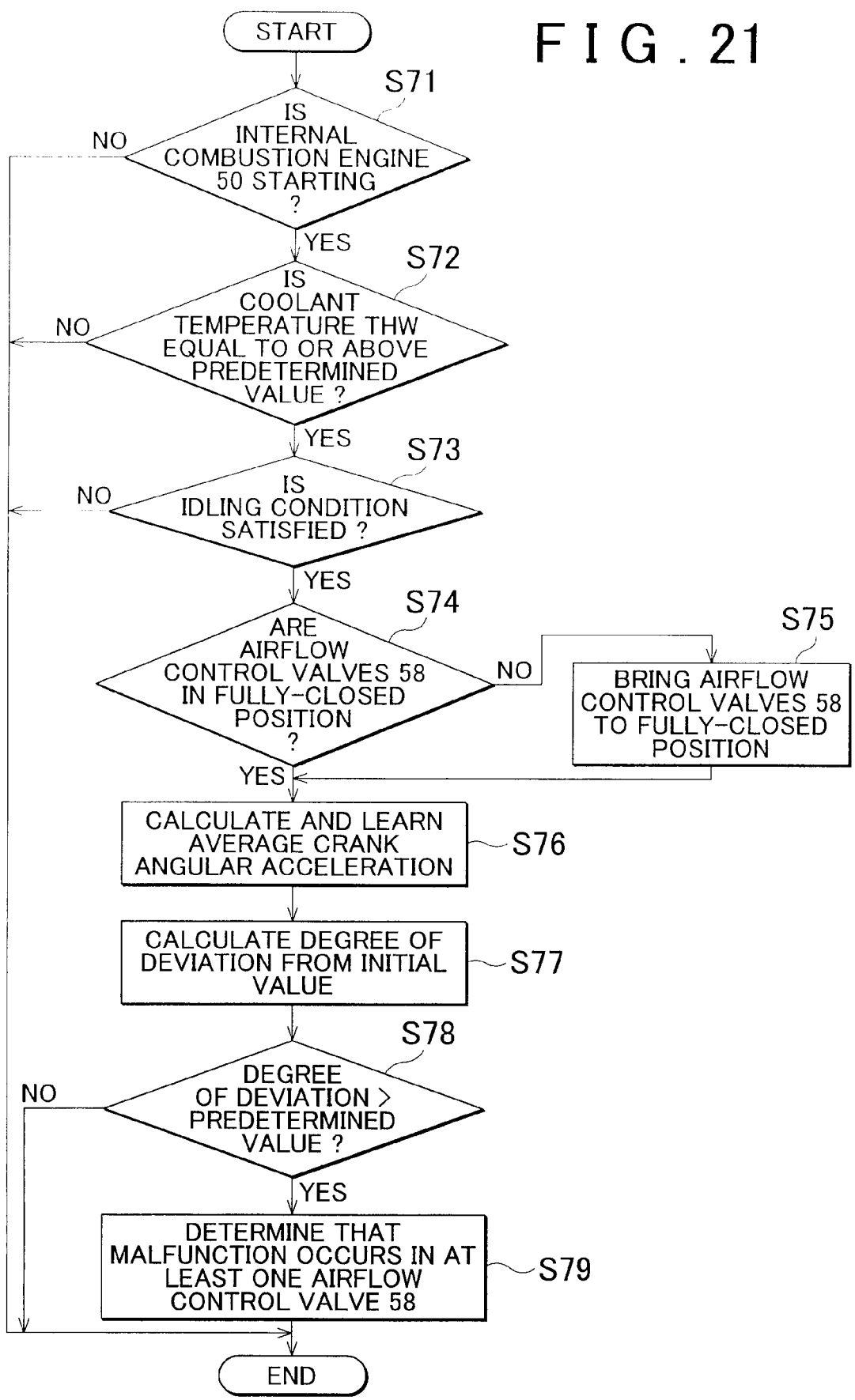
FIG. 21 is a flowchart of a routine executed by an ECU 1E.

Next, a routine, which is executed by the ECU 1E to determine whether a malfunction occurs in the airflow control valve 58 for each cylinder, will be described in detail with reference to a flowchart shown in FIG. 21. Steps 71 to 75 are the same as steps 61 to 65 in the flowchart shown in FIG. 19, and therefore, the description thereof will be omitted. After the process in step 75 is executed, or when an affirmative determination is made in step 74, the CPU calculates the average crank angular acceleration in each cylinder, and learns the calculated average crank angular acceleration in each cylinder (step 76). More specifically, the CPU executes learning by storing the calculated average crank angular acceleration in each cylinder in SRAM (Static Random Access Memory). The SRAM retains data until battery power is off. The ECU 1E includes the SRAM.

Then, the CPU calculates the degree of deviation from the initial value of the average crank angular acceleration in each cylinder (step 77). Then, the CPU determines whether the degree of deviation is larger than a predetermined value (step 78). When a negative determination is made in step 78, no malfunction occurs in the airflow control valves 58, and therefore, the routine ends. When an affirmative determination is made in step 78, the CPU determines that a malfunction occurs in at least one airflow control valve 58 for at least one cylinder in which it is determined that the degree of deviation is large (step 79). In the embodiment, it is determined that a malfunction occurs in step 79. However, it may be temporarily determined that a malfunction occurs in the at least one airflow control valve 58 in step 79. In this case, when a negative determination is made in step 74, the processes in steps 21 to 24 are executed as in the first embodiment, instead of executing the process in step 75. In this manner, it is more accurately determined whether a malfunction occurs in the airflow control valve 58 for each cylinder. Thus, it is possible to implement the ECU 1E that determines whether a malfunction occurs in the airflow control valve 58 for each cylinder, with low cost, and with high determination performance.

Sixth Embodiment

An ECU 1F according to a sixth embodiment is the same as the ECU 1A according to the first embodiment, except that an ignition retard amount calculation program for calculating an ignition retard amount corresponding to the same average crank angular acceleration in each cylinder is provided, and the malfunction determination program further includes a program for determining whether a malfunction occurs in the airflow control valve 58 for each cylinder, based on the ignition retard amount calculated based on the ignition retard amount calculation program, instead of the average crank angular acceleration. More specifically, the ignition retard amount calculation program is made such that the ignition timing in each cylinder is gradually retarded, and the average crank angular acceleration in each cylinder, which corresponds to the ignition timing, is calculated during the period in which the airflow control valves 58 are operated (i.e., the airflow control valves 58 are controlled to be in the fully-closed position in the embodiment) during steady operation (for example, during idling); and the calculated average crank angular acceleration is stored in the RAM, along with the ignition retard amount corresponding to the calculated average crank angular acceleration. Thus, the ignition retard amounts in the cylinders, which correspond to the substantially same average crank angular acceleration, are determined among the plurality of average crank angular accelerations and the ignition retard amounts corresponding to the plurality of average crank angular accelerations, which are stored in the RAM. Then, the ignition retard amounts in the cylinders, which correspond to the substantially same average crank angular acceleration, are compared with each other. In the embodiment, the ignition retard amount is an amount by which the ignition timing is retarded from the idling ignition timing. Instead of storing the ignition retard amount, for example, the ignition timing corresponding to the calculated average crank angular acceleration may be stored.

Figure 22:
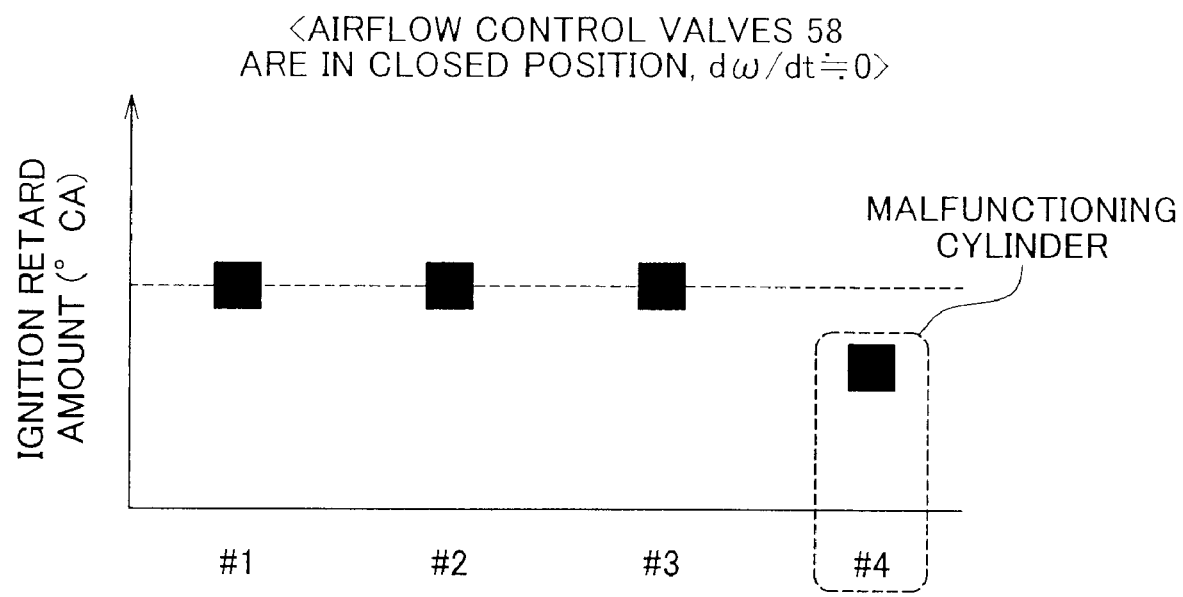
FIG. 22 is a diagram showing an ignition retard amount corresponding to the substantially same average crank angular acceleration in each cylinder.

FIG. 22 is a diagram showing the ignition retard amount in each cylinder, which corresponds to the substantially same average crank angular acceleration. That is, FIG. 22 shows the ignition retard amount in each cylinder when the average crank angular acceleration is substantially zero. The ignition retard amount in each cylinder is detected when the airflow control valves 58 are in the fully-closed position. When the ignition timing is retarded, the combustion state tends to be unstable. When the ignition timings in the cylinders are retarded, and the same combustion state is achieved in the cylinders, the ignition retard amount in a normal cylinder is larger than the ignition retard amount in a malfunctioning cylinder, because the combustion state in the normal cylinder is more stable than the combustion state in the malfunctioning cylinder. In other words, because the combustion state is deteriorated in the malfunctioning cylinder, the ignition timing in the malfunctioning cylinder can be retarded by only a small ignition retard amount. Accordingly, in FIG. 22, it is estimated that the cylinder #4, in which the ignition retard amount is smaller than the ignition retard amount in the other cylinders, is a malfunctioning cylinder, and a malfunction occurs in the airflow control valve 58 for the cylinder #4. It may be determined that the cylinder #4 is a malfunctioning cylinder, for example, by determining whether the ignition retard amount in each cylinder is smaller than a predetermined value. In the embodiment, the ignition retard amount calculator is implemented by the CPU and the like, and the ignition retard amount calculation program. Based on the ignition retard amount corresponding to the substantially same average crank angular acceleration, instead of the average crank angular acceleration, it is determined whether a malfunction occurs in the airflow control valve 58 for each cylinder.

Figure 23:
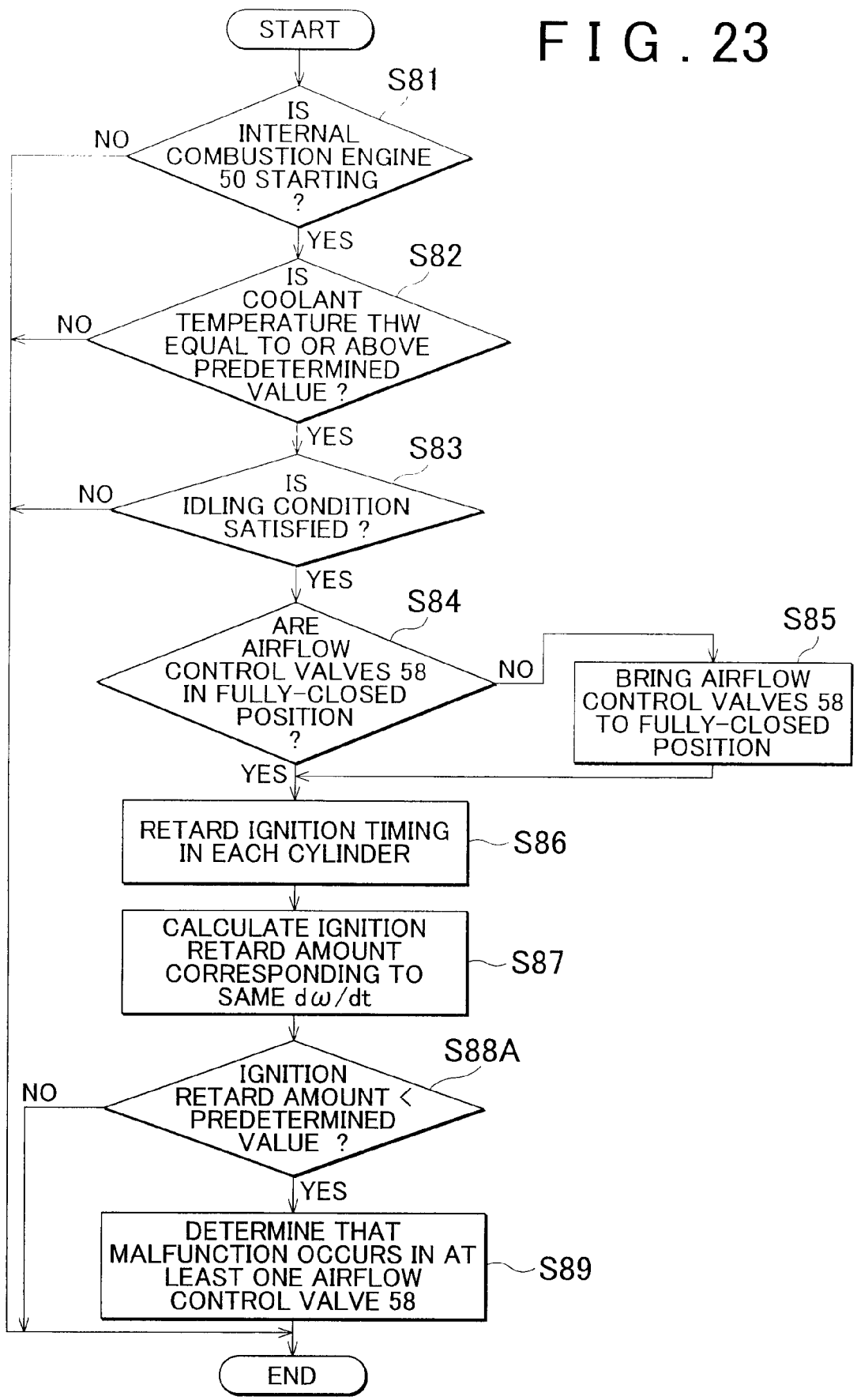
FIG. 23 is a flowchart of a routine executed by an ECU 1F.

Next, a routine, which is executed by the ECU 1F to determine whether a malfunction occurs in the airflow control valve 58 for each cylinder, will be described in detail with reference to a flowchart shown in FIG. 23. Steps 81 to 85 are the same as steps 61 to 65 in the flowchart shown in FIG. 19, and therefore, the description thereof will be omitted. After the process in step 85 is executed, or when an affirmative determination is made in step 84, the CPU retards the ignition timing in each cylinder (step 86). In step 86, at the same time, the average crank angular acceleration in each cylinder is calculated, and the calculated average crank angular acceleration is stored in the RAM, along with the ignition retard amount corresponding to the calculated average crank angular acceleration. Then, the CPU calculates the ignition retard amount in each cylinder, which corresponds to the substantially same average crank angular acceleration (step 87). Then, the CPU determines whether the ignition retard amount is smaller than the predetermined value (step 88A). When a negative determination is made, no malfunction occurs in the airflow control valves 58, and therefore, the routine ends. When an affirmative determination is made, the CPU determines that a malfunction occurs in at least one airflow control valve 58 (step 89).

Figure 24:
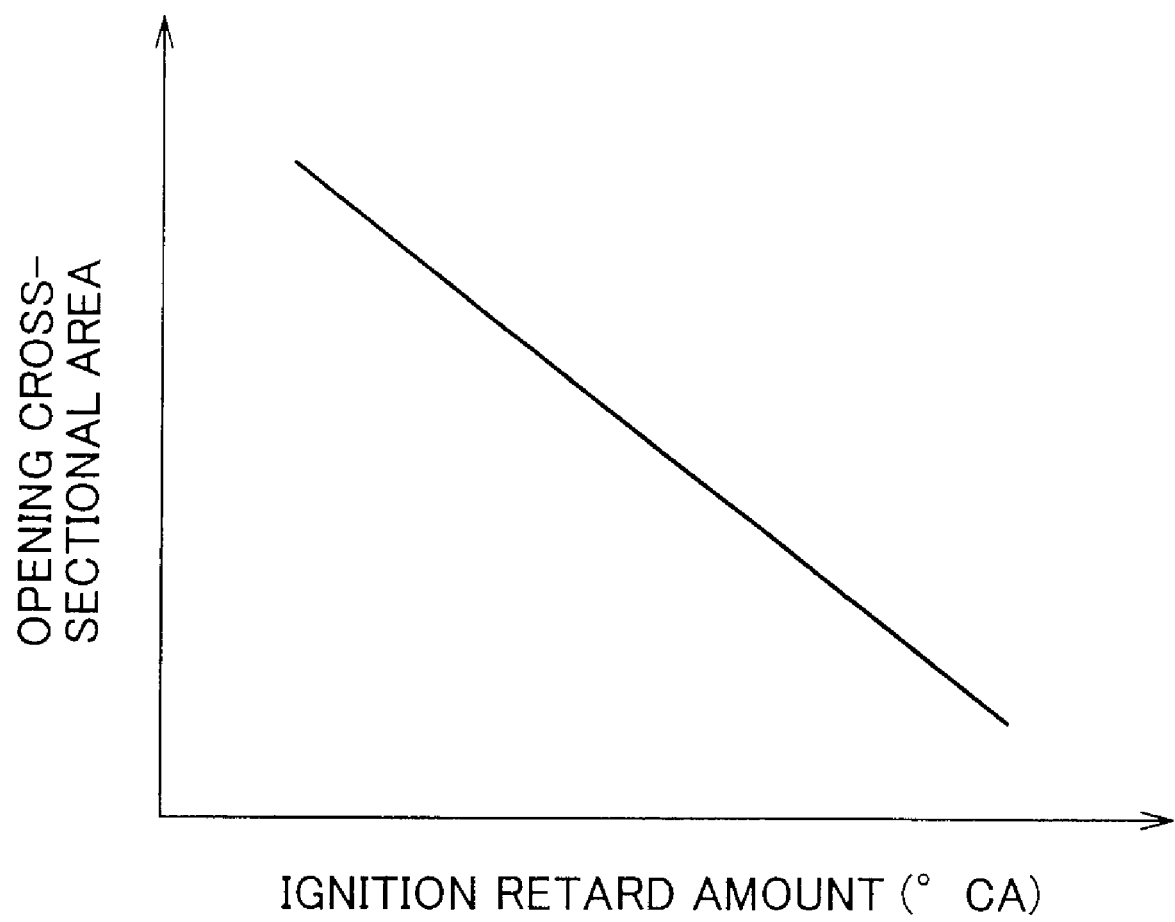
FIG. 24 is a diagram showing the relation between the opening cross-sectional area and the ignition retard amount.

The ignition retard amount corresponding to the substantially same average crank angular acceleration may vary due to the variation in the crank angular acceleration among the internal combustion engine systems 100, as described in the fourth embodiment. Accordingly, the opening cross-sectional area of the intake passage may be estimated based on the ignition retard amount, and it may be determined whether a malfunction occurs in the airflow control valve 58 for each cylinder, based on the estimated opening cross-sectional area of the intake passage. FIG. 24 is a diagram showing the relation between the opening cross-sectional area of the intake passage, and the ignition retard amount. As shown in FIG. 24, as the ignition retard amount decreases, the opening cross-sectional area of the intake passage increases. Accordingly, map data showing the relation (hereinafter, simply referred to as "second opening cross-sectional area map") is stored in the ROM, and when the airflow control valves 58 are operated (i.e., the airflow control valves 58 are controlled to be in the fully-closed position), the opening cross-sectional area of the intake passage for each cylinder is read from the second opening cross-sectional area map based on the ignition retard amount in each cylinder. Thus, the opening cross-sectional area of the intake passage is estimated based on the ignition retard amount. Accordingly, in the embodiment, the ROM further stores a second opening cross-sectional area estimation program for estimating the opening cross-sectional area of the intake passage for each cylinder when the airflow control valves 58 are operated, based on the ignition retard amount in each cylinder. Thus, it is determined whether a malfunction occurs in the airflow control valve 58 for each cylinder, based on the estimated opening cross-sectional area of the intake passage, with high determination performance.

Figure 25:
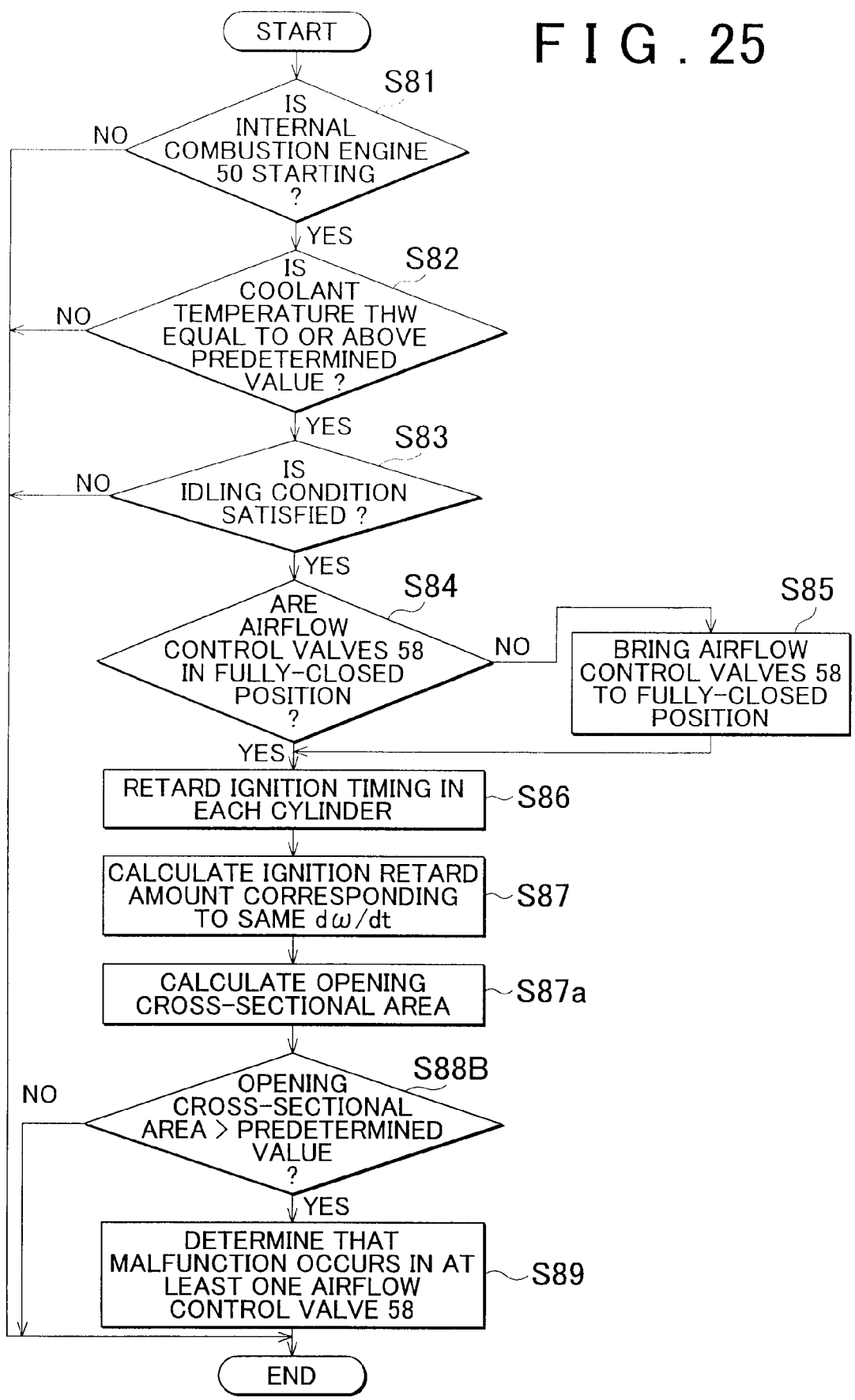
FIG. 25 is a flowchart of a routine executed by the ECU 1F to determine whether a malfunction occurs in the airflow control valve for each cylinder, using the opening cross-sectional area.

Next, a routine, which is executed by the ECU 1F to determine whether a malfunction occurs in the airflow control valve 58 for each cylinder, using the opening cross-sectional area of the intake passage estimated based on the ignition retard amount, will be described in detail with reference to a flowchart shown in FIG. 25. The flowchart shown in FIG. 25 is the same as the flowchart shown in FIG. 23, except that step 87a is added after step 87, and step 88A is changed to step 88B. Therefore, particularly steps 87a and 88B in the flowchart shown in FIG. 25 will be described in detail. After the process in step 87 is executed, the CPU calculates the opening cross-sectional area of the intake passage, which corresponds to the ignition retard amount calculated in step 87, using the second opening cross-sectional area map (step 87a).

Then, the CPU determines whether the opening cross-sectional area is larger than a predetermined value (step 88B). When a negative determination is made in step 88B, no malfunction occurs in the airflow control valves 58, and therefore, the routine ends. When an affirmative determination is made in step 88B, the CPU determines that a malfunction occurs in at least one airflow control valve 58 (step 89). In the embodiment, it is determined that a malfunction occurs in the at least one airflow control valve 58 in step 89. However, it may be temporarily determined that a malfunction occurs in the at least one airflow control valve 58 in step 89. In this case, when a negative determination is made in step 84, the processes in step S21 to S24 are executed as in the first embodiment, instead of executing the process in step 85. In this manner, it is more accurately determined whether a malfunction occurs in the airflow control valve 58 for each cylinder. Thus, it is possible to implement the ECU 1F that determines whether a malfunction occurs in the airflow control valve 58 for each cylinder, with low cost, and with high determination performance.

Seventh Embodiment

An ECU 1G according to a seventh embodiment is the same as the ECU 1A according to the first embodiment, except that a torsion amount calculation program, and an opening-degree correction amount calculation program are further stored in the ROM. The torsion amount calculation program is made to calculate the amount of torsion of the valve shaft 61 based on the difference in the average crank angular acceleration between the cylinder corresponding to the airflow control valve 58 that is closest to the actuator 62, and the cylinder corresponding to the airflow control valve 58 that is farthest from the actuator 62. The opening-degree correction amount calculation program is made to calculate an opening-degree correction amount by which the opening degree of the airflow control valves 58 is corrected, based on the torsion amount. The opening-degree correction amount, by which the opening degree of the airflow control valves 58 is corrected, is used to improve the combustion state that is deteriorated due to torsion of the valve shaft 61.

For example, when the airflow control valves 58 are in a partly-open position, and receive the force of intake air, the airflow control valve 58 fixed at the position farthest from the actuator 62 is likely to tilt to increase the opening cross-sectional area of the intake passage, due to the torsion of the valve shaft 61, as compared to the airflow control valve 58 closest to the actuator 62. When the opening cross-sectional area of the intake passage is increased due to the tilting of the airflow control valve 58, the combustion state is deteriorated in the cylinder corresponding to the airflow control valve 58 that tilts. Accordingly, in the embodiment, the amount of torsion of the valve shaft 61 is calculated based on the average crank angular acceleration in each cylinder. Thus, the degree of deterioration of the combustion state is determined based on the torsion amount. In the embodiment, the combustion state deteriorated due to the torsion of the valve shaft 61 is improved by correcting the opening degree of the airflow control valves 58, instead of improving the combustion state in each cylinder. Therefore, the cylinder, in which the combustion state is deteriorated, is not determined. However, the cylinder, in which the combustion state is deteriorated due to the torsion of the valve shaft 61, is generally regarded as the cylinder corresponding to the airflow control valve 58 fixed at the position farthest from the actuator 62. When the torsion amount is significantly large, for example, when the torsion amount is larger than a predetermined value, it may be determined that the combustion state is deteriorated also in the cylinder adjacent to the cylinder corresponding to the airflow control valve 58 farthest from the actuator 62. In the embodiment, the torsion amount calculator is implemented by the CPU and the like, and the torsion amount calculation program, and the opening-degree correction amount calculator is implemented by the CPU and the like, and the opening-degree correction amount calculation program.

Figure 26:
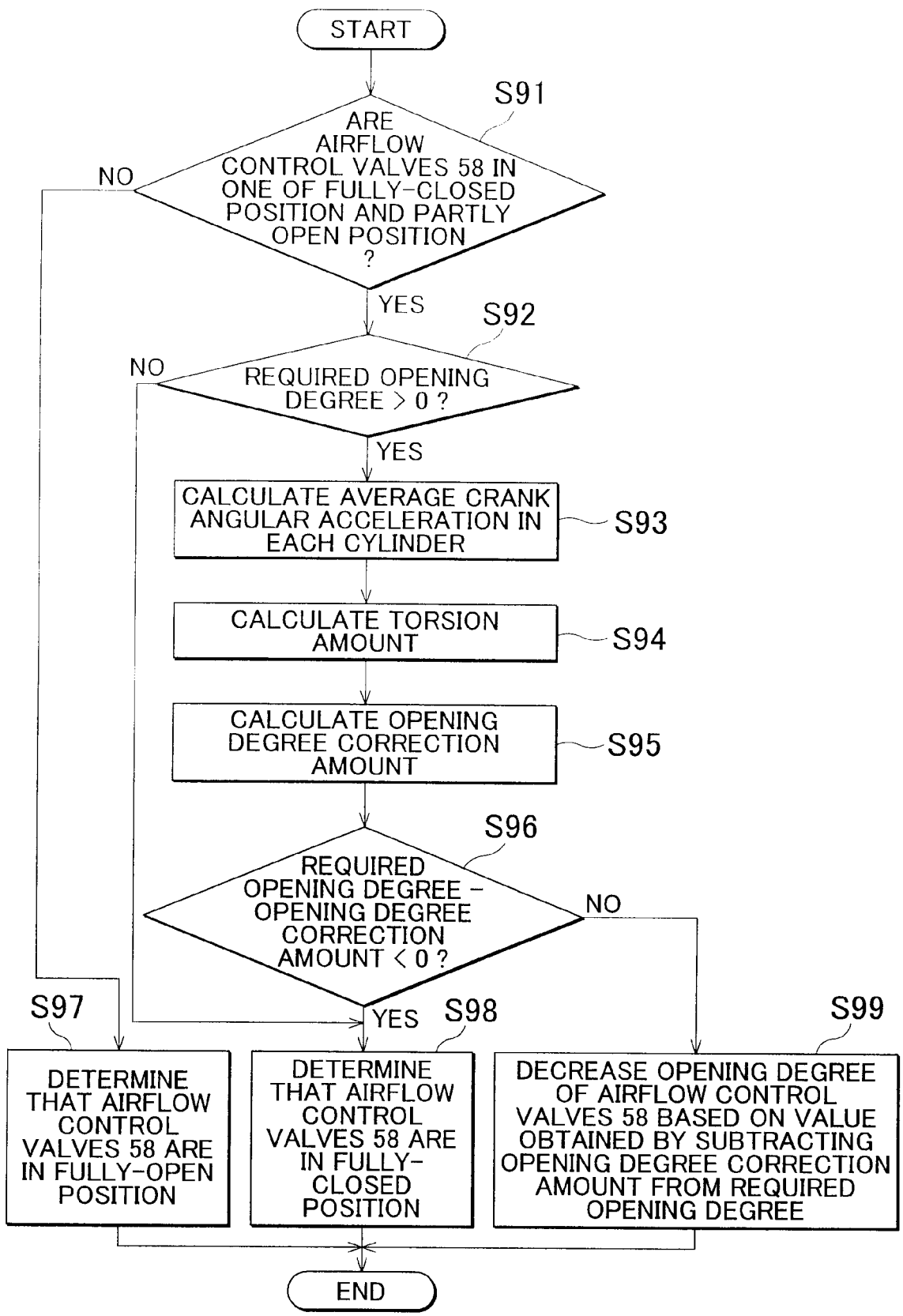
FIG. 26 is a flowchart of a routine executed by an ECU 1G.

Next, a routine, which is executed by the ECU 1G to improve the combustion state deteriorated due to the torsion of the valve shaft 61 by correcting the opening degree of the airflow control valves 58, will be described in detail with reference to a flowchart shown in FIG. 26. Before the routine shown in the flowchart is executed, it may be determined whether a malfunction occurs in at least one airflow control valve 58 due to, for example, deformation, breakage, or falling of the at least one airflow control valve 58, using the methods described in the first to sixth embodiments. The CPU determines whether the airflow control valves 58 are in one of the fully-closed position and partly-open position (step 91). When a negative determination is made in step 91, the CPU determines that the airflow control valves 58 are in the fully-open position (step 97), and the routine shown in the flowchart ends. When an affirmative determination is made in step 91, the CPU determines whether the required opening degree of the airflow control valves 58 is larger than zero (step 92). When a negative determination is made in step 92, the CPU determines that the airflow control valves 58 are in the fully-closed position (step 98), and then the routine ends.

When an affirmative determination is made in step 92, the CPU determines that the airflow control valves 58 are in the partly-open position, and calculates the average crank angular acceleration in each cylinder (step 93). Then, the CPU calculates the torsion amount of the valve shaft 61, based on the average crank angular acceleration calculated in step 93 (step 94). When the combustion state is not deteriorated in any cylinder, the calculated torsion amount is substantially zero. Further, the CPU calculates the opening-degree correction amount by which the opening degree of the airflow control valves 58 is corrected, based on the torsion amount calculated in step 94 (step 95). Then, the CPU determines whether a value obtained by subtracting the opening-degree correction amount from the required opening degree is smaller than zero (step 96). When an affirmative determination is made in step 96, the CPU controls the airflow control valves 58 so that the airflow control valves 58 are in the fully-closed position (step 98), and then the routine ends. When a negative determination is made in step 96, the CPU executes a control to correct the opening degree of the airflow control valves 58 based on the value obtained by subtracting the opening-degree correction amount from the required opening degree (step 99). As a result, the opening degree of the airflow control valves 58 is decreased. Accordingly, it is possible to implement the ECU 1G that determines whether a malfunction occurs in the airflow control valves 58 particularly due to the torsion of the valve shaft 61, and improves the combustion state deteriorated due to the torsion of the valve shaft 61.

Eighth Embodiment

An ECU 1H according to an eighth embodiment is the same as the ECU 1G according to the seventh embodiment, except that an ignition retard amount decrease program, and an air-fuel ratio correction program are further stored in the ROM. The ignition retard amount decrease program is made to decrease the ignition retard amount in the cylinder(s) in which the combustion state is deteriorated due to the torsion of the valve shaft 61, based on the amount of torsion of the valve shaft 61, to improve the combustion state according to the degree of deterioration of the combustion state. The air-fuel ratio correction program is made to decrease the air-fuel ratio in the cylinder(s) in which the combustion state is deteriorated due to the torsion of the valve shaft 61, based on the amount of torsion of the valve shaft 61, to improve the combustion state according to the degree of deterioration of the combustion state. Based on the ignition retard amount decrease program or the air-fuel ratio correction program, the ignition retard amount or the air-fuel ratio is changed only in the specific cylinder(s) in which the combustion state is deteriorated. Thus, it is possible to suppress an adverse effect, for example, on the performance of warming the catalyst, as compared to the case where the ignition retard amount or the air-fuel ratio is changed in all the cylinders.

The cylinder corresponding to the airflow control valve 58 farthest from the actuator 62 is generally the specific cylinder in which the combustion state is deteriorated due to the torsion of the valve shaft 61. In the embodiment, the degree of deterioration of the combustion state is determined based on the torsion amount. However, the invention is not limited to this configuration. For example, the CPU may determine whether the combustion state is deteriorated in each of the cylinder corresponding to the airflow control valve 58 farthest from the actuator 62 to the cylinder corresponding to the airflow control valve 58 that is the second closest to the actuator 62 in the stated order, by determining whether the difference in the average crank angular acceleration between the cylinder corresponding to the airflow control valve 58 closest to the actuator 62 and each of the other cylinders is larger than a predetermined value. In the embodiment, the ignition retard amount decrease device is implemented by the CPU and the like, and the ignition retard amount decrease program, and the air-fuel ratio correction device is implemented by the CPU and the like, and the air-fuel ratio correction program.

Figure 27:
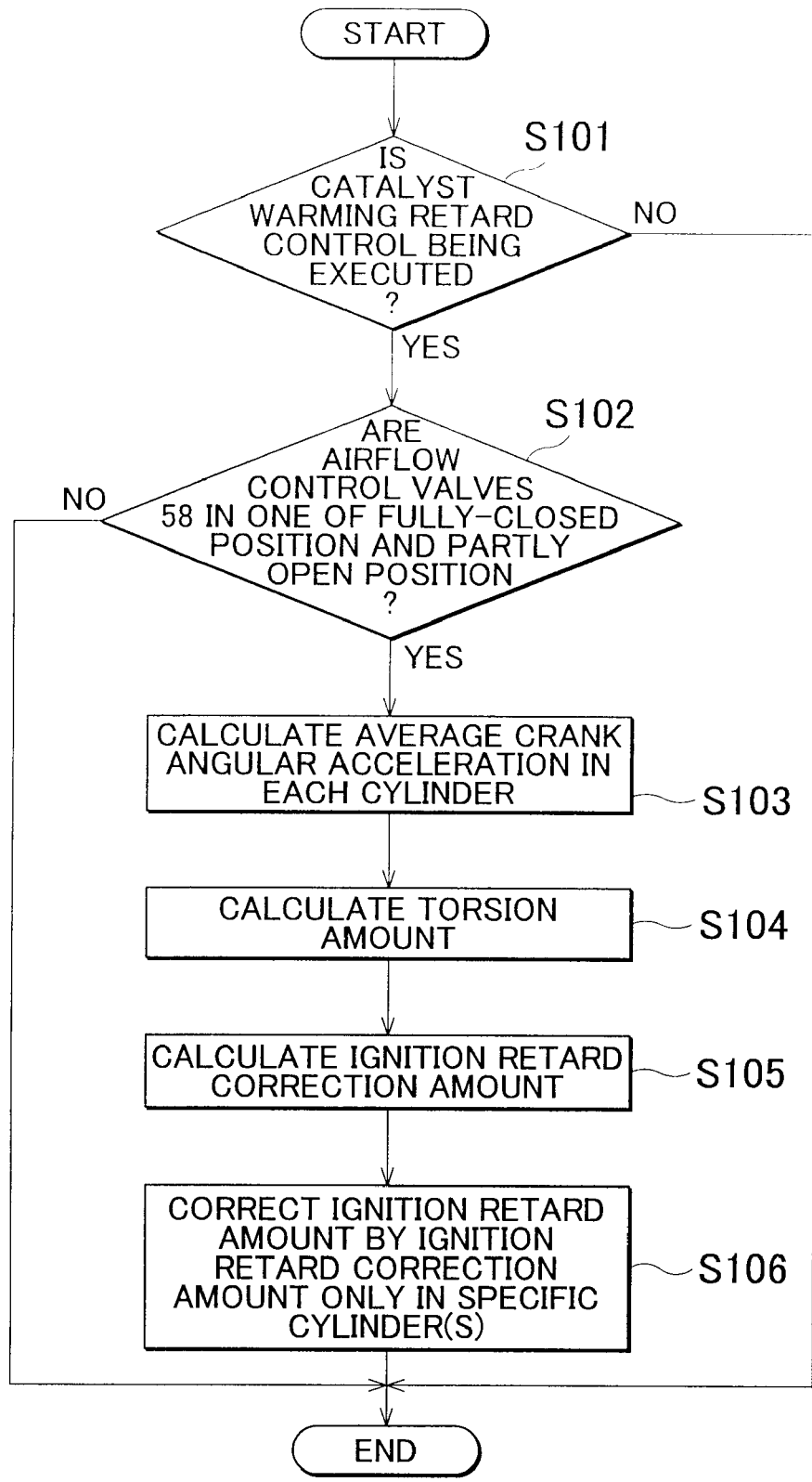
FIG. 27 is a flowchart of a routine executed by an ECU 1H to improve a combustion state deteriorated due to the torsion of the valve shaft, by correcting the ignition retard amount.

Next, a routine, which is executed by the ECU 1H to improve the combustion state deteriorated due to the torsion of the valve shaft 61 by correcting the ignition retard amount, will be described in detail with reference to a flowchart shown in FIG. 27. Before the routine shown in the flowchart is executed, it may be determined whether a malfunction occurs in at least one airflow control valve 58 due to, for example, deformation, breakage, or falling of the at least one airflow control valve 58, using the methods described in the first to sixth embodiments. The CPU determines whether a catalyst warming retard control, which retards the ignition timing to warm the catalyst, is being executed (step 101). When a negative determination is made in step 101, no process in the flowchart needs to be executed, and the routine ends. When an affirmative determination is made in step 101, the CPU determines whether the airflow control valves 58 are in one of the fully-closed position and the partly-open position (step 102). When a negative determination is made in step 102, no process in the flowchart needs to be executed, and therefore, the routine ends.

When an affirmative determination is made in step 102, the CPU calculates the average crank angular acceleration in each cylinder (step 103). Then, the CPU calculates the amount of torsion of the valve shaft 61 based on the average crank angular acceleration calculated in step 103 (step 104). In step 104, the degree of deterioration of the combustion state is determined based on the torsion amount. In the embodiment, when the torsion amount is smaller than a predetermined value, it is determined that the combustion state is deteriorated in the cylinder corresponding to the airflow control valve 58 farthest from the actuator 62. When the torsion amount is larger than the predetermined value, it is determined that the combustion state is deteriorated also in the cylinder adjacent to the cylinder corresponding to the airflow control valve 58 farthest from the actuator 62. Further, the CPU calculates an ignition retard correction amount by which the ignition retard amount is corrected, based on the torsion amount calculated in step 104 (step 105). Then, the CPU corrects the ignition retard amount by the ignition retard correction amount only in the specific cylinder(s) in which the combustion state is deteriorated (step 106). Thus, it is possible to improve the deteriorated combustion state, while suppressing an adverse effect on the performance of warming the catalyst.

Figure 28:
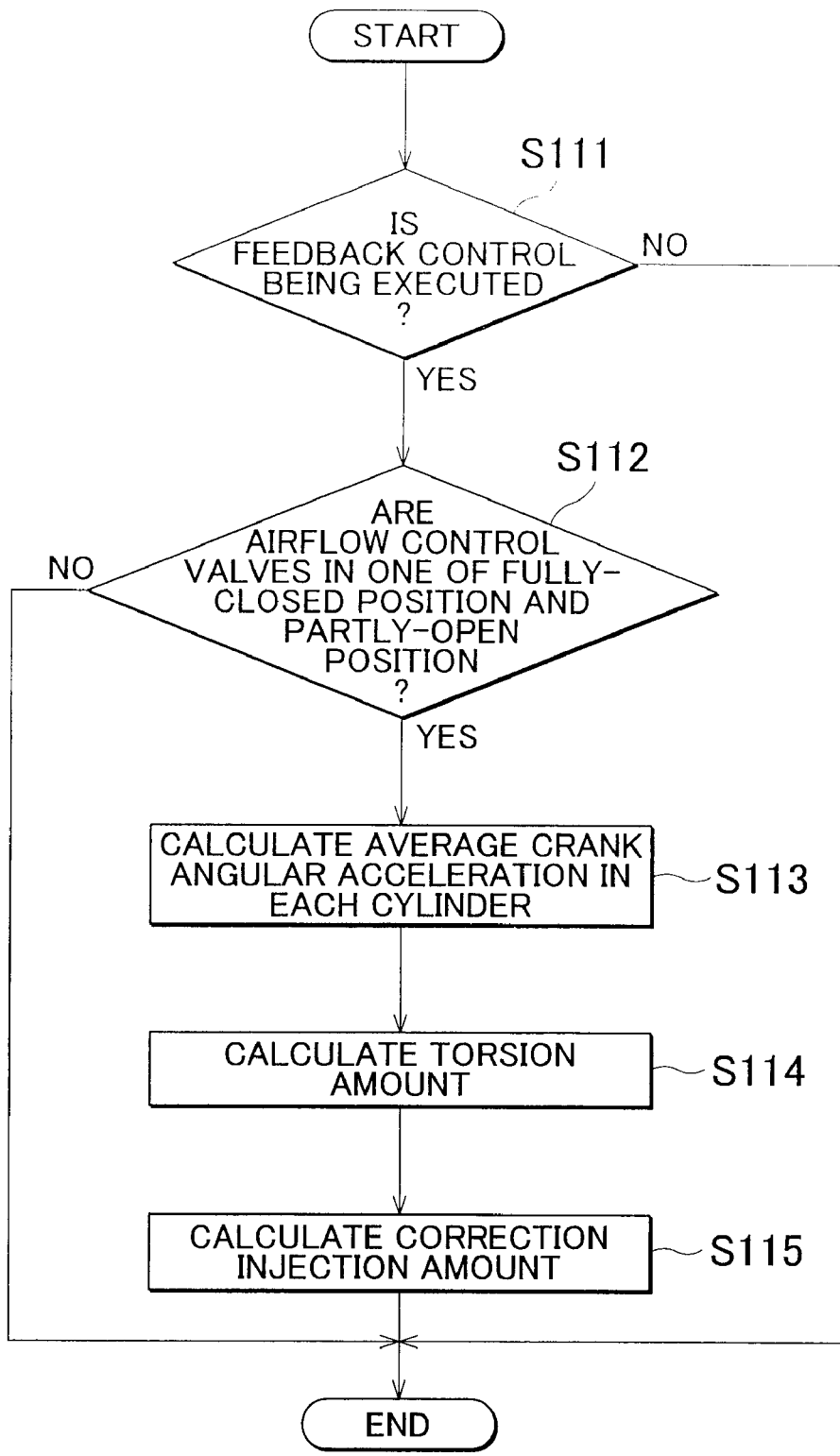
FIG. 28 is a flowchart of a routine executed by the ECU 1H to improve the combustion state deteriorated due to the torsion of the valve shaft, by correcting an air-fuel ratio.

Next, a routine, which is executed by the ECU 1H to improve the combustion state deteriorated due to the torsion of the valve shaft 61 by correcting the air-fuel ratio, will be described in detail with reference to a flowchart shown in FIG. 28. Before the routine shown in the flowchart is executed, it may be determined whether a malfunction occurs in at least one airflow control valve 58 due to, for example, deformation, breakage, or falling of the at least one airflow control valve 58, using the methods described in the first to sixth embodiments. The CPU determines whether the feedback control is being executed (step 111). When a negative determination is made in step 111, no process in the flowchart needs to be executed, and therefore the routine ends. When an affirmative determination is made in step 111, the CPU determines whether the airflow control valves 58 are in one of the fully-closed position and partly-open position (step 112). When a negative determination is made in step 112, no process in the flowchart needs to be executed, and therefore the routine ends.

When an affirmative determination is made in step 112, the CPU calculates the average crank angular acceleration in each cylinder (step 113). Then, the CPU calculates the amount of torsion of the valve shaft 61 based on the average crank angular acceleration calculated in step 113 (step 114). In the embodiment, when the torsion amount is smaller than the predetermined value, it is determined that the combustion state is deteriorated in the cylinder corresponding to the airflow control valve 58 farthest from the actuator 62. When the torsion amount is larger than the predetermined value, it is determined that the combustion state is deteriorated also in the cylinder adjacent to the cylinder corresponding to the airflow control valve 58 farthest from the actuator 62. Further, the CPU calculates a correction injection amount by which a fuel injection amount is corrected, based on the torsion amount calculated in step 104, to decrease the air-fuel ratio in the specific cylinder(s) (step 115). Accordingly, it is possible to improve the combustion state, while suppressing an adverse effect on the performance of warming the catalyst. Thus, it is possible to implement the ECU 1G that determines whether a malfunction occurs in the airflow control valves 58 particularly due to the torsion of the valve shaft 61, and improves the combustion state deteriorated due to the torsion of the valve shaft 61 in each cylinder.

The above-described embodiments are example embodiments. The invention is not limited to the embodiments. Various modifications may be made within the scope of the invention.

What is claimed is:

1. A malfunction diagnostic apparatus for a combustion improvement device, comprising:

a combustion improvement device disposed in an intake passage connected to each of combustion chambers in an internal combustion engine to improve a combustion state;

a detector that detects an average crank angular acceleration or a correlated value correlated with the average crank angular acceleration in each of cylinders in the internal combustion engine;

an operating state detector that detects a current operating state of the combustion improvement device; and a malfunction determination device that determines whether a malfunction occurs in the combustion improvement device for each of the cylinders, based on the average crank angular acceleration and the current operating state of the combustion improvement device, wherein if the average crank angular acceleration is a negative value in at least one of the cylinders when at least one of the combustion improvement devices for the at least one of the cylinders is operated, the malfunction determination device determines that a malfunction occurs in the at least one of the combustion improvement devices for the at least one of the cylinders in which the average crank angular acceleration is the negative value.

2. The malfunction diagnostic apparatus according to claim 1, wherein if the average crank angular acceleration is a negative value in at least one of the cylinders when at least one of the combustion improvement devices for the at least one of the cylinders is operated, and if the average crank angular acceleration is a positive value in the at least one of the cylinders when the at least one of the combustion improvement devices for the at least one of the cylinders is not operated, the malfunction determination device determines that a malfunction occurs in the at least one of the combustion improvement devices for the at least one of the cylinders in which the average crank angular acceleration is the negative value when the at least one of the combustion improvement device for the at least one of the cylinders is operated.

3. A malfunction diagnostic apparatus for a combustion improvement device, comprising:

a combustion improvement device disposed in an intake passage connected to each of combustion chambers in an internal combustion engine to improve a combustion state;

a detector that detects an average crank angular acceleration or a correlated value correlated with the average crank angular acceleration in each of cylinders in the internal combustion engine;

an operating state detector that detects a current operating state of the combustion improvement device;

a malfunction determination device that determines whether a malfunction occurs in the combustion improvement device for each of the cylinders, based on the average crank angular acceleration or the correlated valve and the current operating state of the combustion improvement device;

an air-fuel ratio feedback controller that executes a feedback control on an air-fuel ratio in the internal combustion engine; and a trajectory length calculator that calculates a length of a trajectory showing variation in a crank angular acceleration in a predetermined time after the internal combustion engine starts, wherein:

the malfunction determination device determines whether a malfunction occurs in the combustion improvement device for each of the cylinders, based on the length of the trajectory showing the variation in the crank angular acceleration, when the feedback control on the air-fuel ratio is not executed; and the malfunction determination device determines whether a malfunction occurs in the combustion improvement device for each of the cylinders, based on the average crank angular acceleration, when the feedback control on the air-fuel ratio is executed.

4. A malfunction diagnostic apparatus for a combustion improvement device, comprising:

a combustion improvement device disposed in an intake passage connected to each of combustion chambers in an internal combustion engine to improve a combustion state;

a detector that detects an average crank angular acceleration or a correlated value correlated with the average crank angular acceleration in each of cylinders in the internal combustion engine;

an operating state detector that detects a current operating state of the combustion improvement device;

a malfunction determination device that determines whether a malfunction occurs in the combustion improvement device for each of the cylinders, based on the average crank angular acceleration and the current operating state of the combustion improvement device; and an idling ignition timing feedback controller that executes a feedback control on an idling ignition timing, wherein the detector detects the average crank angular acceleration in each of the cylinders in the internal combustion engine when the feedback control on the idling ignition timing is executed.

5. A malfunction diagnostic apparatus for a combustion improvement device, comprising:

a combustion improvement device disposed in an intake passage connected to each of combustion chambers in an internal combustion engine to improve a combustion state;

a detector that detects an average crank angular acceleration or a correlated value correlated with the average crank angular acceleration in each of cylinders in the internal combustion engine;

an operating state detector that detects a current operating state of the combustion improvement device; and a malfunction determination device that determines whether a malfunction occurs in the combustion improvement device for each of the cylinders, based on the average crank angular acceleration or the correlated valve and the current operating state of the combustion improvement device, wherein the detector comprises an opening cross-sectional area estimator that estimates, as the correlated value, an opening cross-sectional area of the intake passage when the combustion improvement device is operated, based on the average crank angular acceleration, wherein the malfunction determination device determines whether a malfunction occurs in the combustion improvement device for each of the cylinders, based on the opening cross-sectional area estimated by the opening cross-sectional area estimator.

6. A malfunction diagnostic apparatus for a combustion improvement device, comprising:

a combustion improvement device disposed in an intake passage connected to each of combustion chambers in an internal combustion engine to improve a combustion state;

a detector that detects an average crank angular acceleration or a correlated value correlated with the average crank angular acceleration in each of cylinders in the internal combustion engine;

an operating state detector that detects a current operating state of the combustion improvement device; and a malfunction determination device that determines whether a malfunction occurs in the combustion improvement device for each of the cylinders, based on the average crank angular acceleration and the current operating state of the combustion improvement device, wherein:

the detector detects the average crank angular acceleration a plurality of times at time intervals, and comprises a deviation degree calculator that calculates, as the correlated value, a degree of deviation of a value of the average crank angular acceleration detected for a second time or later, from an initial value of the average crank angular acceleration, wherein the malfunction determination device determines whether a malfunction occurs in the combustion improvement device for each of the cylinders, based on the degree of deviation calculated by the deviation degree calculator.

7. A malfunction diagnostic apparatus for a combustion improvement device, comprising:

a combustion improvement device disposed in an intake passage connected to each of combustion chambers in an internal combustion engine to improve a combustion state;

a detector that detects an average crank angular acceleration or a correlated value correlated with the average crank angular acceleration in each of cylinders in the internal combustion engine;

an operating state detector that detects a current operating state of the combustion improvement device; and a malfunction determination device that determines whether a malfunction occurs in the combustion improvement device for each of the cylinders, based on the average crank angular acceleration or the correlated valve and the current operating state of the combustion improvement device, wherein the detector comprises an ignition retard amount calculator that calculates, as the correlated value, an ignition retard amount corresponding to a substantially same average crank angular acceleration in each of the cylinders, and the malfunction determination device determines whether a malfunction occurs in the combustion improvement device for each of the cylinders, based on the ignition retard amount in each of the cylinders, which is calculated by the ignition retard amount calculator.

8. A malfunction diagnostic apparatus for a combustion improvement device, comprising:

a combustion improvement device disposed in an intake passage connected to each of combustion chambers in an internal combustion engine to improve a combustion state;

a detector that detects an average crank angular acceleration or a correlated value correlated with the average crank angular acceleration in each of cylinders in the internal combustion engine;

an operating state detector that detects a current operating state of the combustion improvement device; and a malfunction determination device that determines whether a malfunction occurs in the combustion improvement device for each of the cylinders, based on the average crank angular acceleration or the correlated valve and the current operating state of the combustion improvement device, wherein the detector comprises an ignition retard amount calculator that calculates an ignition retard amount corresponding to a substantially same average crank angular acceleration in each of the cylinders; and an opening cross-sectional area estimator that estimates, as the correlated value, an opening cross-sectional area of the intake passage when the combustion improvement device is operated, based on the ignition retard amount, and the malfunction determination device determines whether a malfunction occurs in the combustion improvement device for each of the cylinders, based on the opening cross- sectional area estimated by the opening cross-sectional area estimator.

9. A malfunction diagnostic apparatus for a combustion improvement device, comprising:
a combustion improvement device disposed in an intake passage connected to each of combustion chambers in an internal combustion engine to improve a combustion state;
a detector that detects an average crank angular acceleration or a correlated value correlated with the average crank angular acceleration in each of cylinders in the internal combustion engine;
an operating state detector that detects a current operating state of the combustion improvement device; and
a malfunction determination device that determines whether a malfunction occurs in the combustion improvement device for each of the cylinders, based on the average crank angular acceleration or the correlated valve and the current operating state of the combustion improvement device, wherein:
the combustion improvement device is an airflow control valve that is disposed in an exhaust passage, and that controls a flow of intake air flowing into the internal combustion engine;
a situation where the combustion improvement device is operated is a situation where the airflow control valve is in a closed position;
the combustion improvement device includes a valve shaft fixed to a plurality of the airflow control valves provided for the respective cylinders, and an actuator that is connected to one end of the valve shaft, and that opens and closes the airflow control valves through the valve shaft;
the detector detects a first average crank angular acceleration in the cylinder corresponding to the airflow control valve that is closest to the actuator, and a second average crank angular acceleration in the cylinder corresponding to the airflow control valve that is farthest from the actuator; and
the malfunction diagnostic apparatus further comprises a torsion amount calculator that calculates an amount of torsion of the valve shaft, based on a difference between the first average crank angular acceleration and the second average crank angular acceleration.

10. The malfunction diagnostic apparatus according to claim 9, wherein the malfunction diagnostic apparatus further comprises an opening-degree correction amount calculator that calculates an opening-degree correction amount by which an opening degree of the airflow control valves is corrected, based on the amount of torsion of the valve shaft.

11. The malfunction diagnostic apparatus according to claim 9, wherein the malfunction diagnostic apparatus further comprises an ignition retard amount decrease device that calculates an ignition retard correction amount, by which an ignition retard amount is corrected, in the cylinder corresponding to each of the airflow control valves, based on the amount of torsion of the valve shaft.

12. The malfunction diagnostic apparatus according to claim 9, wherein the malfunction diagnostic apparatus further comprises an air-fuel ratio correction device that calculates a correction injection amount, by which a fuel injection amount is corrected, in the cylinder corresponding to each of the airflow control valves, based on the amount of torsion of the valve shaft.

13. A malfunction diagnostic apparatus for a combustion improvement device, comprising:
a combustion improvement device disposed in an intake passage connected to each of combustion chambers in an internal combustion engine to improve a combustion state;
a trajectory length calculator that calculates a length of a trajectory showing variation in a crank angular acceleration in a predetermined time after the internal combustion engine starts by converting negative values of the crank angular acceleration to positive values and then accumulating the positive values of the crank angular acceleration;
an operating state detector that detects a current operating state of the combustion improvement device; and
a malfunction determination device that determines whether a malfunction occurs in the combustion improvement device for each of the cylinders, based on the length of the trajectory showing the variation in the crank angular acceleration and the current operating state of the combustion improvement device.

14. The malfunction diagnostic apparatus according to claim 13, wherein if the length of the trajectory showing the variation in the crank angular acceleration is longer than a predetermined value when at least one of the combustion improvement devices for the at least one of the cylinders is operated, the malfunction determination device determines that a malfunction occurs in the at least one of the combustion improvement devices for the at least one of the cylinders in which the length of the trajectory showing the variation in the crank angular acceleration is longer than the predetermined value.

15. A malfunction diagnostic method for a combustion improvement device disposed in an intake passage connected to each of combustion chambers in an internal combustion engine to improve a combustion state, the method comprising:
detecting an average crank angular acceleration or a correlated value correlated with the average crank angular acceleration in each of cylinders in the internal combustion engine;
detecting a current operating state of the combustion improvement device; and
determining whether a malfunction occurs in the combustion improvement device for each of the cylinders, based on the average crank angular acceleration and the current operating state of the combustion improvement device
wherein in the determination step, if the average crank angular acceleration is a negative value in at least one of the cylinders when at least one of the combustion improvement devices for the at least one of the cylinders is operated, it is determined that a malfunction occurs in the at least one of the combustion improvement devices for the at least one of the cylinders in which the average crank angular acceleration is the negative value.

16. The malfunction diagnostic method according to claim 15, wherein in the determination step, if the average crank angular acceleration is a negative value in at least one of the cylinders when at least one of the combustion improvement devices for the at least one of the cylinders is operated, and if the average crank angular acceleration is a positive value in the at least one of the cylinders when the at least one of the combustion improvement devices for the at least one of the cylinders is not operated, it is determined that a malfunction occurs in the at least one of the combustion improvement devices for the at least one of the cylinders in which the average crank angular acceleration is the negative value when the at least one of the combustion improvement devices for the at least one of the cylinders is operated.

17. A malfunction diagnostic method for a combustion improvement device disposed in an intake passage connected to each of combustion chambers in an internal combustion engine to improve a combustion state, the method comprising:
- detecting an average crank angular acceleration or a correlated value correlated with the an average crank angular acceleration in each of cylinders in the internal combustion engine;
- detecting a current operating state of the combustion improvement device;
- determining whether a malfunction occurs in the combustion improvement device for each of the cylinders, based on the average crank angular acceleration or the correlated value and the current operating state of the combustion improvement device; and
- estimating, as the correlated value, an opening cross-sectional area of the intake passage when the combustion improvement device is operated, based on the average crank angular acceleration, wherein in the determination step, it is determined whether a malfunction occurs in the combustion improvement device for each of the cylinders, based on the estimated opening cross-sectional area.

18. A malfunction diagnostic method for a combustion improvement device disposed in an intake passage connected to each of combustion chambers in an internal combustion engine to improve a combustion state, the method comprising:
- detecting an average crank angular acceleration or a correlated value correlated with the an average crank angular acceleration in each of cylinders in the internal combustion engine;
- detecting a current operating state of the combustion improvement device;
- determining whether a malfunction occurs in the combustion improvement device for each of the cylinders, based on the average crank angular acceleration or the correlated value and the current operating state of the combustion improvement device; and
- calculating, as the correlated value, an ignition retard amount corresponding to a substantially same average crank angular acceleration in each of the cylinders, wherein in the determination step, it is determined that a malfunction occurs in the combustion improvement device for each of the cylinders, based on the calculated ignition retard amount in each of the cylinders.

19. A malfunction diagnostic method for a combustion improvement device disposed in an intake passage connected to each of combustion chambers in an internal combustion engine to improve a combustion state, the method comprising:
- calculating a length of a trajectory showing variation in a crank angular acceleration in a predetermined time after the internal combustion engine starts by converting negative values of the crank angular acceleration to positive values and then accumulating the positive values of the crank angular acceleration;
- detecting a current operating state of the combustion improvement device; and
- determining whether a malfunction occurs in the combustion improvement device for each of the cylinders, based on the length of a trajectory showing variation in the crank angular acceleration and the current operating state of the combustion improvement device.

* * * * *